United States Patent
Khosravy et al.

(10) Patent No.: US 8,700,301 B2
(45) Date of Patent: Apr. 15, 2014

(54) MOBILE COMPUTING DEVICES, ARCHITECTURE AND USER INTERFACES BASED ON DYNAMIC DIRECTION INFORMATION

(75) Inventors: Moe Khosravy, Bellevue, WA (US); Lev Novik, Bellevue, WA (US); Darryl E. Rubin, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 784 days.

(21) Appl. No.: 12/362,093

(22) Filed: Jan. 29, 2009

(65) Prior Publication Data

US 2009/0319175 A1    Dec. 24, 2009

Related U.S. Application Data

(60) Provisional application No. 61/073,849, filed on Jun. 19, 2008.

(51) Int. Cl.
*G01C 21/00* (2006.01)
*G01C 21/34* (2006.01)

(52) U.S. Cl.
USPC .......................................... 701/207; 701/213

(58) Field of Classification Search
USPC ....................................................... 701/207
See application file for complete search history.

(56) References Cited

U.S. PATENT DOCUMENTS

| | | |
|---|---|---|
| 4,262,199 A | 4/1981 | Bridges et al. |
| 4,745,545 A | 5/1988 | Schiffleger |
| 5,767,795 A | 6/1998 | Schaphorst |
| 5,781,908 A | 7/1998 | Williams |
| 5,892,900 A | 4/1999 | Ginter |
| 5,948,040 A | 9/1999 | DeLorme |
| 6,133,947 A | 10/2000 | Mikuni |
| 6,141,014 A | 10/2000 | Endo |
| 6,243,076 B1 | 6/2001 | Hatfield |

(Continued)

FOREIGN PATENT DOCUMENTS

| | | |
|---|---|---|
| WO | WO0135307 | 5/2001 |
| WO | WO 02073818 | 9/2002 |

(Continued)

OTHER PUBLICATIONS

SONNTAG. Context-Sensitive Multimodal Mobile Interfaces, 9th Intl. Conf. on Human Computer Interaction with Mobile Devices and Services (MobileHCI'07) http://www.dfki.de/~sonntag/mobilehci2007.pdf. Last accessed Mar. 18, 2009, pp. 142-148.

(Continued)

*Primary Examiner* — Hiep V Nguyen
(74) *Attorney, Agent, or Firm* — Workman Nydegger

(57) ABSTRACT

Mobile endpoints are provided that enable direction based pointing services including a positional component for receiving positional information as a function of a location of the portable electronic device, a directional component that outputs direction information as a function of an orientation of the portable electronic device and a location based engine that processes the positional information and the direction information to determine a subset of points of interest relative to the portable electronic device as a function of at least the positional information and the direction information. Devices can include compass(es), e.g., magnetic or gyroscopic, to determine a direction and GPS systems for determining location. A component for determining acceleration can also optionally be included.

22 Claims, 16 Drawing Sheets

(56) References Cited

U.S. PATENT DOCUMENTS

| | | |
|---|---|---|
| 6,252,544 B1 | 6/2001 | Hoffberg |
| 6,317,688 B1 | 11/2001 | Bruckner et al. |
| 6,317,754 B1 | 11/2001 | Peng |
| 6,321,158 B1 | 11/2001 | DeLorme et al. |
| 6,327,533 B1 | 12/2001 | Chou |
| 6,332,127 B1 | 12/2001 | Bandera |
| 6,353,398 B1 | 3/2002 | Amin et al. |
| 6,360,167 B1 | 3/2002 | Millington |
| 6,372,974 B1 | 4/2002 | Gross |
| 6,374,180 B1 | 4/2002 | Slominski et al. |
| 6,381,465 B1 | 4/2002 | Chern et al. |
| 6,381,603 B1 | 4/2002 | Chan et al. |
| 6,421,602 B1 | 7/2002 | Bullock |
| 6,466,938 B1 | 10/2002 | Goldberg |
| 6,470,264 B2 | 10/2002 | Bide |
| 6,526,335 B1 | 2/2003 | Treyz |
| 6,542,818 B1 | 4/2003 | Oesterling |
| 6,615,246 B2 | 9/2003 | Pivowar |
| 6,636,873 B1 | 10/2003 | Carini |
| 6,643,669 B1 | 11/2003 | Novak |
| 6,661,353 B1 | 12/2003 | Gopen |
| 6,672,506 B2 | 1/2004 | Swartz et al. |
| 6,678,882 B1 | 1/2004 | Hurley |
| 6,741,188 B1 | 5/2004 | Miller et al. |
| 6,763,226 B1 | 7/2004 | McZeal, Jr. |
| D494,584 S | 8/2004 | Schlieffers et al. |
| 6,795,768 B2 | 9/2004 | Bragansa et al. |
| 6,796,505 B2 | 9/2004 | Pellaumail et al. |
| 6,810,405 B1 | 10/2004 | LaRue |
| 6,837,436 B2 | 1/2005 | Swartz et al. |
| 6,850,837 B2 | 2/2005 | Paulauskas et al. |
| 6,895,503 B2 | 5/2005 | Tadayon |
| 6,898,517 B1 | 5/2005 | Froeberg |
| 6,912,398 B1 | 6/2005 | Domnitz |
| 6,930,715 B1 | 8/2005 | Mower |
| 6,983,293 B2 | 1/2006 | Wang |
| 6,992,619 B2 | 1/2006 | Harrison |
| 7,010,501 B1 | 3/2006 | Roslak et al. |
| 7,031,875 B2 | 4/2006 | Ellenby |
| 7,032,003 B1 | 4/2006 | Shi |
| 7,040,541 B2 | 5/2006 | Swartz et al. |
| 7,063,263 B2 | 6/2006 | Swartz et al. |
| 7,064,706 B2 | 6/2006 | King et al. |
| 7,082,365 B2 | 7/2006 | Sheha et al. |
| 7,092,964 B1 | 8/2006 | Dougherty |
| 7,103,365 B2 | 9/2006 | Myllymaki |
| 7,103,370 B1 | 9/2006 | Creemer |
| 7,103,844 B2 | 9/2006 | Jones |
| 7,107,038 B2 | 9/2006 | Fitch et al. |
| 7,133,892 B2 | 11/2006 | Khan |
| 7,136,945 B2 | 11/2006 | Gibbs |
| 7,171,378 B2 | 1/2007 | Petrovich et al. |
| 7,191,218 B1 | 3/2007 | Innes |
| 7,195,157 B2 | 3/2007 | Swartz et al. |
| 7,245,923 B2 | 7/2007 | Frank |
| 7,321,826 B2 | 1/2008 | Sheha |
| 7,340,333 B2 | 3/2008 | Lenneman et al. |
| 7,385,501 B2 | 6/2008 | Miller |
| 7,389,179 B2 | 6/2008 | Jin et al. |
| 7,428,418 B2 | 9/2008 | Cole et al. |
| 7,460,953 B2 | 12/2008 | Herbst et al. |
| 7,501,981 B2 | 3/2009 | Rahman et al. |
| 7,587,276 B2 | 9/2009 | Gold |
| 7,602,944 B2 | 10/2009 | Campbell et al. |
| 7,620,404 B2 * | 11/2009 | Chesnais et al. ............ 455/456.1 |
| 7,720,844 B2 | 5/2010 | Chu |
| 7,747,528 B1 | 6/2010 | Robinson et al. |
| 7,788,032 B2 * | 8/2010 | Moloney ....................... 701/213 |
| 7,801,058 B2 | 9/2010 | Wang |
| 7,844,415 B1 | 11/2010 | Bryant |
| 7,941,269 B2 | 5/2011 | Laumeyer |
| 7,990,394 B2 | 8/2011 | Vincent |
| 8,014,763 B2 | 9/2011 | Hymes |
| 8,023,962 B2 | 9/2011 | Frank |
| 8,165,034 B2 | 4/2012 | Buchwald |
| 2001/0030664 A1 | 10/2001 | Shulman et al. |
| 2001/0036224 A1 | 11/2001 | Demello |
| 2001/0039546 A1 | 11/2001 | Moore et al. |
| 2002/0002504 A1 | 1/2002 | Engel |
| 2002/0059256 A1 | 5/2002 | Halim |
| 2002/0077905 A1 | 6/2002 | Arndt |
| 2002/0091568 A1 | 7/2002 | Kraft |
| 2002/0124067 A1 | 9/2002 | Parupudi |
| 2002/0138196 A1 | 9/2002 | Polidi |
| 2002/0191034 A1 | 12/2002 | Sowizral et al. |
| 2003/0046158 A1 | 3/2003 | Kratky |
| 2003/0046164 A1 | 3/2003 | Sato |
| 2003/0061110 A1 | 3/2003 | Bodin |
| 2003/0069690 A1 | 4/2003 | Correia et al. |
| 2003/0069693 A1 | 4/2003 | Snapp |
| 2003/0142853 A1 | 7/2003 | Waehner et al. |
| 2003/0174838 A1 | 9/2003 | Bremer |
| 2003/0182319 A1 | 9/2003 | Morrison |
| 2003/0195851 A1 | 10/2003 | Ong |
| 2003/0208315 A1 | 11/2003 | Mays |
| 2003/0220966 A1 | 11/2003 | Hepper |
| 2004/0024727 A1 | 2/2004 | Bowman |
| 2004/0070602 A1 | 4/2004 | Kobuya et al. |
| 2004/0107072 A1 | 6/2004 | Dietrich et al. |
| 2004/0122870 A1 | 6/2004 | Park |
| 2004/0128324 A1 | 7/2004 | Sheynman |
| 2004/0128499 A1 | 7/2004 | Peterka |
| 2004/0147329 A1 | 7/2004 | Meadows |
| 2004/0153473 A1 | 8/2004 | Hutchinson |
| 2004/0201500 A1 | 10/2004 | Miller et al. |
| 2004/0203863 A1 | 10/2004 | Huomo |
| 2004/0259573 A1 | 12/2004 | Cheng |
| 2005/0015436 A1 | 1/2005 | Singh |
| 2005/0027755 A1 | 2/2005 | Shah |
| 2005/0044187 A1 | 2/2005 | Jhaveri |
| 2005/0049993 A1 | 3/2005 | Nori |
| 2005/0063563 A1 | 3/2005 | Soliman |
| 2005/0071280 A1 | 3/2005 | Irwin |
| 2005/0160014 A1 | 7/2005 | Moss |
| 2005/0172296 A1 | 8/2005 | Schleifer |
| 2005/0203905 A1 | 9/2005 | Jung |
| 2005/0212753 A1 | 9/2005 | Marvit |
| 2005/0223047 A1 | 10/2005 | Shah |
| 2005/0235018 A1 | 10/2005 | Tsinman |
| 2005/0240591 A1 | 10/2005 | Marceau |
| 2005/0256782 A1 | 11/2005 | Sands |
| 2005/0266858 A1 | 12/2005 | Miller et al. |
| 2005/0272442 A1 | 12/2005 | Miller et al. |
| 2006/0004713 A1 | 1/2006 | Korte |
| 2006/0019676 A1 | 1/2006 | Miller et al. |
| 2006/0041663 A1 | 2/2006 | Brown et al. |
| 2006/0047776 A1 | 3/2006 | Chieng |
| 2006/0058041 A1 | 3/2006 | Cheng |
| 2006/0061551 A1 | 3/2006 | Fateh |
| 2006/0064346 A1 | 3/2006 | Steenstra et al. |
| 2006/0069798 A1 | 3/2006 | Li |
| 2006/0106879 A1 | 5/2006 | Zondervan |
| 2006/0106881 A1 | 5/2006 | Leung |
| 2006/0107330 A1 | 5/2006 | Ben-Yaacov |
| 2006/0123010 A1 | 6/2006 | Landry |
| 2006/0123053 A1 | 6/2006 | Scannel |
| 2006/0155778 A1 | 7/2006 | Sharma |
| 2006/0161379 A1 | 7/2006 | Ellenby et al. |
| 2006/0161516 A1 | 7/2006 | Clarke |
| 2006/0176516 A1 | 8/2006 | Rothschild |
| 2006/0190497 A1 | 8/2006 | Inturi |
| 2006/0190572 A1 | 8/2006 | Novik |
| 2006/0194596 A1 | 8/2006 | Deng |
| 2006/0215569 A1 | 9/2006 | Khosravy |
| 2006/0223518 A1 | 10/2006 | Haney |
| 2006/0256007 A1 | 11/2006 | Rosenberg |
| 2006/0256008 A1 | 11/2006 | Rosenberg |
| 2006/0259574 A1 | 11/2006 | Rosenberg |
| 2006/0270421 A1 | 11/2006 | Phillips et al. |
| 2006/0271286 A1 | 11/2006 | Rosenberg |
| 2006/0288053 A1 | 12/2006 | Holt |
| 2006/0288344 A1 | 12/2006 | Brodersen |
| 2006/0291482 A1 | 12/2006 | Evans |
| 2007/0004451 A1 | 1/2007 | Anderson |

(56) References Cited

U.S. PATENT DOCUMENTS

| | | |
|---|---|---|
| 2007/0005243 A1 | 1/2007 | Horvitz |
| 2007/0006098 A1 | 1/2007 | Krumm |
| 2007/0008110 A1 | 1/2007 | Li |
| 2007/0015515 A1 | 1/2007 | Matsuda |
| 2007/0032943 A1 | 2/2007 | Okabe |
| 2007/0053056 A1 | 3/2007 | Charlesworth |
| 2007/0078596 A1 | 4/2007 | Grace |
| 2007/0080216 A1 | 4/2007 | Ward |
| 2007/0091172 A1 | 4/2007 | Lee |
| 2007/0100834 A1 | 5/2007 | Landry |
| 2007/0118278 A1 | 5/2007 | Finn et al. |
| 2007/0130217 A1 | 6/2007 | Linyard |
| 2007/0139366 A1 | 6/2007 | Dunko et al. |
| 2007/0162942 A1 | 7/2007 | Hamynen |
| 2007/0219706 A1 | 9/2007 | Sheynblat |
| 2007/0219708 A1 | 9/2007 | Brasche et al. |
| 2007/0233385 A1 | 10/2007 | Dicke et al. |
| 2007/0242661 A1 | 10/2007 | Tran |
| 2007/0244633 A1 | 10/2007 | Phillips |
| 2007/0271317 A1 | 11/2007 | Carmel |
| 2007/0272738 A1 | 11/2007 | Berkun |
| 2007/0274563 A1 | 11/2007 | Jung et al. |
| 2007/0275691 A1 | 11/2007 | Boda |
| 2007/0282564 A1 | 12/2007 | Sprague |
| 2007/0290037 A1 | 12/2007 | Arellanes |
| 2008/0004802 A1* | 1/2008 | Horvitz ............... 701/209 |
| 2008/0027632 A1 | 1/2008 | Mauderer |
| 2008/0028325 A1 | 1/2008 | Ferren et al. |
| 2008/0036766 A1 | 2/2008 | Ishii |
| 2008/0043108 A1 | 2/2008 | Jung et al. |
| 2008/0056535 A1 | 3/2008 | Bergmann |
| 2008/0065322 A1 | 3/2008 | Ng et al. |
| 2008/0065325 A1 | 3/2008 | Geelen et al. |
| 2008/0071620 A1 | 3/2008 | Lowe |
| 2008/0082254 A1 | 4/2008 | Huhtala et al. |
| 2008/0090591 A1 | 4/2008 | Miller et al. |
| 2008/0091518 A1 | 4/2008 | Eisenson et al. |
| 2008/0091537 A1 | 4/2008 | Miller et al. |
| 2008/0097698 A1 | 4/2008 | Arnold-Huyser et al. |
| 2008/0113674 A1 | 5/2008 | Baig |
| 2008/0122785 A1 | 5/2008 | Harmon |
| 2008/0132249 A1 | 6/2008 | Hamilton |
| 2008/0132251 A1 | 6/2008 | Altman et al. |
| 2008/0140835 A1 | 6/2008 | Bradley |
| 2008/0147730 A1 | 6/2008 | Lee |
| 2008/0161018 A1 | 7/2008 | Miller |
| 2008/0172374 A1 | 7/2008 | Wolosin et al. |
| 2008/0172496 A1* | 7/2008 | Middleton et al. ............ 709/246 |
| 2008/0174679 A1 | 7/2008 | Tanino |
| 2008/0195759 A1 | 8/2008 | Novik et al. |
| 2008/0201074 A1 | 8/2008 | Bleckman et al. |
| 2008/0214166 A1 | 9/2008 | Ramer |
| 2008/0215202 A1* | 9/2008 | Breed ............... 701/25 |
| 2008/0234931 A1 | 9/2008 | Wang et al. |
| 2008/0250337 A1 | 10/2008 | Lemmela et al. |
| 2008/0268855 A1 | 10/2008 | Hanuni |
| 2008/0268876 A1 | 10/2008 | Gelfand |
| 2008/0273109 A1 | 11/2008 | Bamford |
| 2008/0281794 A1 | 11/2008 | Mathur |
| 2008/0288486 A1 | 11/2008 | Kim |
| 2008/0293431 A1 | 11/2008 | Buerger |
| 2009/0005021 A1 | 1/2009 | Forstall et al. |
| 2009/0005076 A1 | 1/2009 | Forstall et al. |
| 2009/0005077 A1 | 1/2009 | Forstall et al. |
| 2009/0005080 A1 | 1/2009 | Forstall |
| 2009/0005968 A1 | 1/2009 | Vengroff et al. |
| 2009/0005987 A1 | 1/2009 | Vengroff et al. |
| 2009/0006194 A1 | 1/2009 | Sridharan |
| 2009/0030778 A1 | 1/2009 | Zapata |
| 2009/0033540 A1 | 2/2009 | Breed et al. |
| 2009/0036145 A1 | 2/2009 | Rosenblum |
| 2009/0037273 A1 | 2/2009 | Zhu |
| 2009/0040370 A1 | 2/2009 | Varanasi |
| 2009/0102859 A1 | 4/2009 | Athsani et al. |
| 2009/0143078 A1 | 6/2009 | Tu et al. |
| 2009/0163228 A1 | 6/2009 | Blumberg |
| 2009/0192704 A1 | 7/2009 | Geelen |
| 2009/0198767 A1 | 8/2009 | Jakobson |
| 2009/0248288 A1 | 10/2009 | Bell et al. |
| 2009/0259568 A1 | 10/2009 | Lee |
| 2009/0315766 A1 | 12/2009 | Khosravy |
| 2009/0315775 A1 | 12/2009 | Khosravy |
| 2009/0315776 A1 | 12/2009 | Khosravy |
| 2009/0315995 A1 | 12/2009 | Khosravy |
| 2009/0318168 A1 | 12/2009 | Khosravy |
| 2009/0319166 A1 | 12/2009 | Khosravy |
| 2009/0319177 A1 | 12/2009 | Khosravy |
| 2009/0319178 A1 | 12/2009 | Khosravy |
| 2009/0319181 A1 | 12/2009 | Khosravy |
| 2009/0319348 A1 | 12/2009 | Khosravy |
| 2010/0008255 A1 | 1/2010 | Khosravy |
| 2010/0009662 A1 | 1/2010 | Khosravy |
| 2010/0016022 A1 | 1/2010 | Liu |
| 2010/0030646 A1 | 2/2010 | Riise |
| 2010/0076968 A1 | 3/2010 | Boyns |
| 2010/0228612 A1 | 9/2010 | Khosravy |
| 2010/0332324 A1 | 12/2010 | Khosravy |
| 2011/0093227 A1 | 4/2011 | Huang |

FOREIGN PATENT DOCUMENTS

| | | |
|---|---|---|
| WO | WO02095535 | 11/2002 |
| WO | WO 2005101200 | 10/2005 |
| WO | WO 2005116794 | 12/2005 |
| WO | 2006024873 A3 | 3/2006 |
| WO | 2008007260 A2 | 1/2008 |
| WO | WO 2008014255 | 1/2008 |

OTHER PUBLICATIONS

Kratz, et al. Gesture Recognition Using Motion Estimation on Mobile Phones. http://www.permid.org/2007/pdf/permid2007_kratz.pdf. Last accessed Mar. 18, 2009, 5 pages.

Hariharan, et al. Web-Enhanced GPS. http://research.microsoft.com/en-us/um/people/horvitz/web_gps.pdf. Last accessed Mar. 20, 2009, 10 pages.

Denham, et al. Getting from Point A to Point B: A Review of Two GPS Systems. AFB AccessWorld, Nov. 2004 Issue, vol. 5, No. 6. http://www.afb.org/AFBPress/pub.asp?DocID=aw050605. Last accessed May 8, 2009, 10 pages.

Rashid, et al. "Implementing Location Based Information/Advertising for Existing Mobile Phone Users in Indoor/Urban Environments", Proceedings of the International Conference on Mobile Business (ICMB '05). http://ieeexplore.ieee.org/iel5/9999/32116/01493635.pdf?tp=&isnumber=&arnumber=1493635. Last accessed Sep. 16, 2008, 7 pages.

The iPointer Platform Next Generation Location-Based Services Today. http://www.i-spatialtech.com/PDF/ipointer_data_sheet.pdf. Last accessed May 19, 2009, 2 pages.

Simon, et al. Towards Orientation-Aware Location Based Mobile Services. http://p2d.ftw.at/papers/SimonKunczierAnegg.pdf. Last accessed May 19, 2009, 8 pages.

Werbach. Location-Based Computing: Wherever You Go, There You Are. Esther Dyson's Monthly Report, Release 1.0, vol. 18, No. 6, Jun. 28, 2000. http://cdn.oreilly.com/radar/r1/06-00.pdf. Last accessed May 19, 2009, 32 pages.

Iwasaki, et al., "Azim: Direction Based Service using Azimuth Based Position Estimation", Proceedings of the 24th International Conference on Distributed Computing Systems (ICDCS '04). http://ieeexplore.ieee.org/iel5/9016/28619/01281638.pdf?tp=&isnumber=&arnumber=1281638. Last accessed Sep. 13, 2008, 10 pages.

Kim, et al., "Efficient and Dynamic Location-based Event Service for Mobile Computing Environments", 0-7695-2945-310 IEEE, Fifth International Conference on Computational Science and Applications, 2007. http://ieeexplore.ieee.org/iel5/4301108/4301109/04301175.pdf. Last accessed Sep. 13, 2008, 7 pages.

Sense Networks Launches Software Platform That Indexes the real World Using Mobile Location Data. Jun. 9, 2008. http://www.lbszone.com/content/view/3439/21. Last accessed Mar. 20, 2009, 1 page.

(56) References Cited

OTHER PUBLICATIONS

Trusca. Sanoodi Releases SMap, a Free GPS RouteRecording Mobile Application. Oct. 28, 2008. http://news.softpedia.com/news/Sanoodi-Releases-SMap-a-Free-GPS-Route-Recording-Mobile-Application-96626.shtml. Last accessed Mar. 20, 2009, 2 pages.
Jaques. Vendors Plug-in to Connected Navigation. Apr. 16, 2008. http://www.vnunet.com/vnunet/news/2214407/vendors-plug-connected. Last accessed Mar. 20, 2009, 2 pages.
Liaw. Verizon Wireless Releases VZ NavigatorVersion 4. May 9, 2008. http://www.slashphone.com/verizon-wireless-releases-vz-navigator-version-4-09438. Last accessed Mar. 20, 2009, 6 pages.
POIAlert. http://www.wayviewer.de/en/poialert.html. Last accessed Mar. 20, 2009, 4 pages.
Mitchell. Use GPS and Web Maps for Location-Aware Apps. http://msdn.microsoft.com/en-us/magazine/2009.01.wm6gps.aspx. Last accessed Mar. 20, 2009, 6 pages.
Sony NV-U92T Sat Nav Systems, Nov. 3, 2008. http://www.satellitenavigation.org.uk/category/sony/page/2/, Retrieved on Mar. 17, 2009, 10 pages.
Sony NV-U80 Widescreen Portable Navigation. http://incarexpress.co.uk/view_product.php?partno=NVU80. Retrieved on Mar. 17, 2009, 2 pages.
Solyman. IbnBatota—Technology for a Mobile Map Application, Directions Magazine, published Mar. 27, 2005. http://www.directionsmag.com/article.php?article_id=807&trv=1. Retrieved on Mar. 17, 2009, 6 pages.
Marsh. Sole Source Dead: Long Live Loran? Jun. 1, 2004. http://www.aviationtoday.com/av/issue/feature/920.html. Last accessed Mar. 16, 2009, 4 pages.
Benshoof. Civilian GPS Systemsand PotentialVulnerabilities. www.navcen.uscg.gov/cgsic/meetings/EISubcommittee/2005_presentations/06%20Vulner%20PRA.ppt. Last accessed Mar. 16, 2009, 23 pages.
Bond. GNSS Sole Means of Navigation and The Future Mix of Navigation Systems in ATC. http://www.loran.org/ILAArchive/LanghorneBondPapers/21FutureMixOfNavigationSystemsInATC.pdf. Last accessed Mar. 16, 2009, 5 pages.
Rossmuller. Digital SLR GPS system. Mar. 11, 2007. http://www.letsgodigital.org/en/13416/slr_camera_gps_system/. Last accessed Mar. 20, 2009, 3 pages.
Dr. Marshall. Geotagging with GPS Capture and Process. Sep. 19, 2008. http://geotate.com/files/Geotate_CP_White_Paper.pdf. Last accessed Mar. 20, 2009, 25 pages.
Pashtan, et al. Personal Service Areas for Mobile Web Applications. IEEE 1089-7801/04. http://www.ece.northwestern.edu/~peters/references/personal_serv_areas_IEEE-IC.pdf. Last accessed Mar. 23, 2009, 7 pages.
Stewart, et al. Accessible Contextual Information for Urban Orientation. UbiComp'08, Sep. 21-24, 2008, Seoul, Korea. ACM 978-1-60558-136-1/08/09. http://www.si.umich.edu/mwnewman/pubs/ubicomp08-stewart-talkingpoints.pdf. Last accessed Mar. 23, 2009, 4 pages.
Max J. Egenhofer and Werner Kuhn, Beyond Desktop GIS, http://www.spatial.maine.edu/~max/BeyondDesktopGIS.pdf, 3 pages.
Haicom Electronics Corp, Hi-406bt-C Bluetooth GPS Receiver with Digital Compass, http://13030597.trustpass.alibaba.com/product/11705884/Hi_406bt_C_Bluetooth_GPS_Receiver_With_Digital_Compass.html, Jun. 19, 2008, 3 pages.
Neil Brown, GPSTuner from Megalith, http://www.clieuk.co.uk/gpstuner.shtml, Jun. 19, 2008, 9 pages.
Efficasoft, Efficasoft GPS Utilities, http://www.clickapps.com/moreinfo.htm?pid=14274&section=PPC&PHPSESSID=af43ec3daed820b0e01d0e8cfa68849b&T091620080618=1, Jun. 19, 2008, 3 pages.
U.S. Appl. No. 12/437,857, filed May 31, 2011, Office Action.
Daniel Sonntag, Context-Sensitive Multimodal Mobile Interfaces, 9th Intl. Conf on Human Computer Interaction with Mobile Devices and Services (MobileHCI'07), http://www.dfki.de/~Sonntag/mobilehci2007.pdf, pp. 142-148, 2007.
Sven Kratz & Rafael Ballagas, Gesture Recognition Using Motion Estimation on Mobile Phones, http://www.permid.org/2007/pdf/permid2007_dratz.pdf, 5 pages.
Ramaswamy Hariharan, et al., Web-Enhanced GPS, http://research.microsoft.com/en-us/um/people/horvits/web_gps.pdf, 10 pages.
Jim Denham, et al., Getting from Point A to Point B: A Review of Two GPS Systems, AFB AccessWorld, Nov. 2004 Issue, vol. 5, No. 6, http://www.afb.org/AFBPress/pub.asp?DocID=aw050605, 10 pages.
U.S. Appl. No. 12/476,406, filed Apr. 18, 2011, Office Action.
U.S. Appl. No. 12/437,863, filed Jun. 22, 2011, Office Action.
U.S. Appl. No. 12/483,982, filed Jul. 20, 2011, Office Action.
Chris Weider, et al., "LDAP Multi-Master Replication Protocol" http://hegel.ittc.ku.edu/topics/internet/internet-drafts/draft-i/draftietf-asid-ldap-mult-mast-rep-02.txt, Dec. 15, 2006.
"Administrator's Guide", Red Hat Directory Server, Version 7.1, May 2005.
Coatta, et al. A Data Synchronization Service for Ad Hoc Groups. WCNC 2004/IEEE Communications Society, 0-7803-8344-3/04 IEEE. Http://ieeexplore.ieee.org/iel5/9178/29114/01311592.pdf 6 pages.
Advantages of Microsoft Merge Replication for Mobile and Distributed Applications (White Paper). Published: Feb. 2006. http://download.microsoft.com/download/3/d/9/3d93d494-6ad0-4651-86de-09elbd43d03f/SQL2005MergeComparitive. Doc., 13 pages.
Liu, et al., A License-Sharing Scheme in Digital Rights Management http://smealsearch2.psu.edu/cach/papers/Business/1574/http:zSzzSzwww.smartinternet.com.auzSzSitwebzSzpublicationzSzfileszSz136_zCz24zCz24zCz24_36879zszp03_043.pdf/a-license-sharing-scheme.pdf/. Last accessed Dec. 12, 2006, 13 pages.
Brogan. Enhancing Digital Rights Management Using the Family Domain. In: Proceedings of the 4th Winona Comuter Science Undergraduate Research Seminar, Apr. 20-21, 2004, Winona, MN, US., 7 pages.
Kwok, et al., A License Management Model to Support B2C and C2C Music Sharing. Http://wwwconf.ecs.soton.ac.uk/archive/00000143/01/1008.pdf. Last accessed Dec. 13, 2006, 2 pages.
Reti, et al., DiMaS: Distributing Multimedia on Peer-to-Peer File Sharing Networks. MM'04, Oct. 10-16, 2004, New York, New York, USA. ACM, 2 pages.
U.S. Appl. No. 11/673,415, Nov. 25, 2008, Office Action.
U.S. Appl. No. 12/437,857, Jul. 27, 2011, Office Action.
U.S. Appl. No. 11/673,415, Jul. 14, 2009, Notice of Allowance.
U.S. Appl. No. 12/476,417, Aug. 9, 2011, Office Action.
U.S. Appl. No. 12/476,426, Aug. 3, 2011, Office Action.
U.S. Appl. No. 12/364,936, Oct. 5, 2011, Office Action.
U.S. Appl. No. 12/363,655, Sep. 20, 2011, Office Action.
Office Action dated Dec. 7, 2011 cited in U.S. Appl. No. 12/476,426.
Office Action dated Nov. 9, 2011 cited in U.S. Appl. No. 12/536,937.
Office Action dated Jan. 4, 2012 cited in U.S. Appl. No. 12/363,655.
Office Action dated Dec. 12, 2011 cited in U.S. Appl. No. 12/483,920.
Office Action dated Jan. 11, 2012 cited in U.S. Appl. No. 12/476,417.
Office Action dated Dec. 19, 2012 cited in U.S. Appl. No. 13/485,320.
Office Action dated Jan. 3, 2013 cited in U.S. Appl. No. 12/437,863.
Office Action dated Jan. 29, 2013 cited in U.S. Appl. No. 12/363,655.
U.S. Appl. No. 12/483,920, May 7, 2012, Notice of Allowance.
U.S. Appl. No. 12/536,889, May 24, 2012, Office Action.
U.S. Appl. No. 13/908,737, filed Jun. 3, 2013, Khosravy.
U.S. Appl. No. 12/437,863, Jun. 6, 2013, Office Action.
U.S. Appl. No. 13/485,320, filed May 31, 2012, Khosravy.
U.S. Appl. No. 12/364,936, Jun. 7, 2012, Office Action.
U.S. Appl. No. 12/476,406, Jun. 21, 2012, Notice of Allowance.
U.S. Appl. No. 12/536,937, Jun. 21, 2012, Office Action.
Notice of Allowance dated Aug. 21, 2013 cited in U.S. Appl. No. 13/485,320.
Sagiraju, et al. A Novel Advertising Application Using GPS and GIS. http://www.gisdevelopment.net/application/Miscellaneous/mi08_67.html, Last Accessed Mar. 24, 2009, 5 pages.
Stojanovic, et al. Modeling and Querying Mobile Objects in Location-Based Services. FACTA Universitatis (NI'S) Ser. Math. Inform.

(56) References Cited

OTHER PUBLICATIONS 18 (2003), 59-80. http://facta.junis.ni.ac.rs/mai/mai18/mai18-05.pdf. Last Accessed Mar. 24, 2009, 22 pages.
"New Technology Product Links Online Shoppers With Brick-And-Mortar Merchants; Yclip, First Data", Business Wire, May 18, 2000, http://www.allbusiness.com/marketing-advertising/6443230-1.html, 3 pages.
Office Action dated Sep. 29, 2011 cited in U.S. Appl. No. 12/491,519.
Office Action dated Oct. 17, 2011 cited in U.S. Appl. No. 12/483,982.
Office Action dated Oct. 14, 2011 cited in U.S. Appl. No. 12/483,982.
Office Action dated Oct. 6, 2011 cited in U.S. Appl. No. 12/536,917.
Office Action dated Oct. 11, 2011 cited in U.S. Appl. No. 12/400,087.
Office Action dated Aug. 30, 2012 cited in U.S. Appl. No. 12/437,863.
Office Action dated Aug. 10, 2012 cited in U.S. Appl. No. 13/485,320.
Notice of Allowance dated Feb. 14, 2013 cited in U.S. Appl. No. 12/437,857.
Office Action dated Feb. 7, 2012 cited in U.S. Appl. No. 12/437,863.
Office Action dated Feb. 10, 2012 cited in U.S. Appl. No. 12/536,889.
Notice of Allowance dated Feb. 21, 2012 cited in U.S. Appl. No. 12/483,982.
Office Action dated Mar. 16, 2012 cited in U.S. Appl. No. 12/491,519.
Office Action dated Mar. 16, 2012 cited in U.S. Appl. No. 12/400,087.
Office Action dated Mar. 16, 2012 cited in U.S. Appl. No. 12/536,917.
Office Action dated Oct. 19, 2012 cited in U.S. Appl. No. 13/437,857.
Office Action dated Sep. 26, 2013 in U.S. Appl. No. 12/437,863.
Notice of Allowance dated Oct. 29, 2013 in U.S. Appl. No. 12/536,889.

* cited by examiner

*Determine Object at which Mobile Device is Pointed based on Location (e.g., GPS) and Motion Vector (e.g., Compass, Accelerometer, etc.)*

MOBILE COMPUTING DEVICES, ARCHITECTURE AND USER INTERFACES BASED ON DYNAMIC DIRECTION INFORMATION

CROSS-REFERENCE TO RELATED APPLICATIONS

This application claims priority to U.S. Provisional Application Ser. No. 61/073,849, filed on Jun. 19, 2008 entitled "MOBILE COMPUTING DEVICES, ARCHITECTURE AND USER INTERFACES BASED ON DYNAMIC DIRECTION INFORMATION", the entirety of which is incorporated herein by reference.

TECHNICAL FIELD

The subject disclosure relates to devices, services, applications, architectures, user interfaces and scenarios for mobile computing devices based on dynamic direction information associated with a portable computing device.

BACKGROUND

By way of background concerning some conventional systems, mobile devices, such as portable laptops, PDAs, mobile phones, navigation devices, and the like have been equipped with location based services, such as global positioning system (GPS) systems, WiFi, cell tower triangulation, etc. that can determine and record a position of mobile devices. For instance, GPS systems use triangulation of signals received from various satellites placed in orbit around Earth to determine device position. A variety of map-based services have emerged from the inclusion of such location based systems that help users of these devices to be found on a map and to facilitate point to point navigation in real-time and search for locations near a point on a map.

However, such navigation and search scenarios are currently limited to displaying relatively static information about endpoints and navigation routes. While some of these devices with location based navigation or search capabilities allow update of the bulk data representing endpoint information via a network, e.g., when connected to a networked portable computer (PC) or laptop, such data again becomes fixed in time. Accordingly, it would be desirable to provide a set of pointing-based or directional-based services that enable a richer experience for users than conventional experiences predicated on location and conventional processing of static bulk data representing potential endpoints of interest.

The above-described deficiencies of today's location based systems and devices are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In various embodiments, direction based pointing services are enabled for mobile endpoints including a positional component for receiving positional information as a function of a location of the portable electronic device, a directional component that outputs direction information as a function of an orientation of the portable electronic device and a location based engine that processes the positional information and the direction information to determine a subset of points of interest relative to the portable electronic device as a function of at least the positional information and the direction information.

To accomplish one or more of the foregoing, devices can include compass(es), e.g., magnetic or gyroscopic, to determine a direction and location based systems for determining location, e.g., GPS. A component for determining acceleration can also be included to assist with gesture recognition in connection with discerning different intended uses of the pointing services by the user.

These and other embodiments are described in more detail below.

BRIEF DESCRIPTION OF THE DRAWINGS

Various non-limiting embodiments are further described with reference to the accompanying drawings in which.

DETAILED DESCRIPTION

Overview

Figure 1:
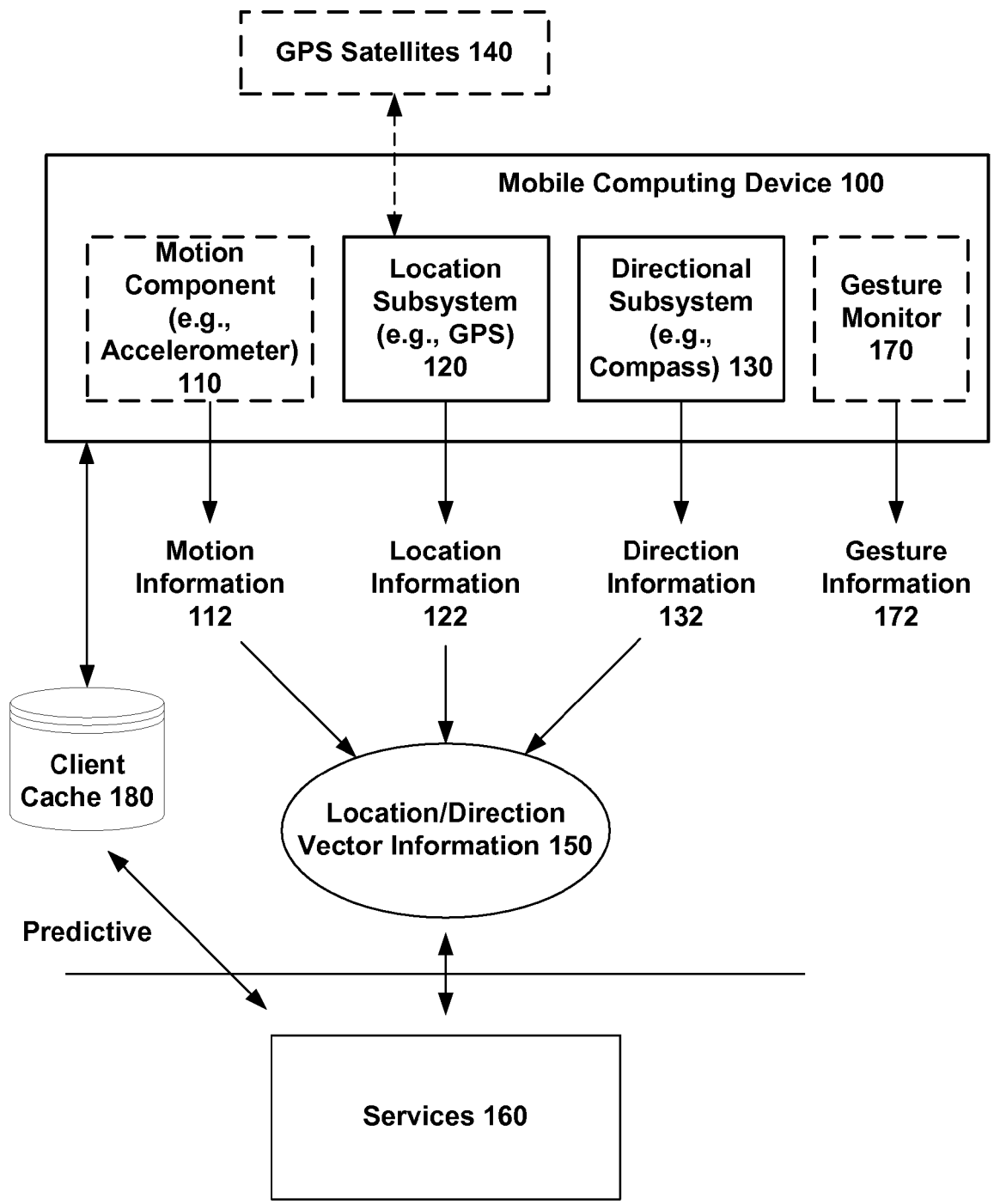
FIG. 1 illustrates a block diagram of a non-limiting device architecture for pointing based services.

As discussed in the background, among other things, current location services systems and services, e.g., GPS, cell triangulation, P2P location service, such as Bluetooth, WiFi, etc., tend to be based on the location of the device only, and tend to provide static experiences that are not tailored to a user because the data about endpoints of interest is relatively static. At least partly in consideration of these deficiencies of conventional location based services, various embodiments of an improved portable device are provided that enable users to point a device directionally and receive static and/or dynamic information in response from a networked service, such as provided by one or more servers, or as part of a cloud services experience.

In one embodiment, information is predictively stored/updated in a local cache as the user/device moves, so that information about endpoints of potential interest to a user's present position and path is already available on the device by the time the user requires the information.

In another non-limiting aspect, users can interact with the endpoints in a host of context sensitive ways to provide or update information associated with endpoints of interest, or to receive beneficial information or instruments from entities associated with the endpoints of interest.

Accordingly, in various non-limiting embodiments, mobile computing devices can include solid state or magnetic compasses, which allow users to point their handsets to a location of interest, instead of engaging in a conventional search, and gain synchronized information about a location from an owner of the endpoint, one or more third parties, or a web service, such as a mapping service.

Leveraging digital compasses and GPS to provide direction and location information enables a next-generation of location based search services, discoverability services and mobile gaming services, where the digital compass and GPS can be used as a pointing device. Using a digital compass, e.g., solid state, magnetic, sun/moon based, etc. on a mobile endpoint facilitates point and upload scenarios, point and synchronize geographical information to a Web service, cloud services or another endpoint.

In various embodiments, algorithms are applied to direction information to define a scope of objects of interest for a device, such as a set of objects displayed within a bounding box or bounding curve shown the display of the device. For instance, ray tracing can be used to define a scope of objects within a certain angle or distance from a device. While in some embodiments, a compass can conveniently provide direction information, a compass is optional. In this regard, any collision detection method can be used to define a set of objects of interest for the device, e.g., for display and interaction from a user. For instance, a bounding curve such as a bounding box, or sphere, of a user intersecting can be used as a basis to display points of interest, such as people, places, and things near the user. As another alternative, location information can be used to infer direction information about the device.

For instance, one scenario includes pointing to a building, using the device's GPS, accelerometer, and digital compass to discover the vector formed by the device and the point of view (POV) location to which the user is pointing. If no information exists, the user can enter information about the object or location, which can be synchronized to the applicable service.

Another exemplary, non-limiting scenario includes point and click synchronization where, for instance, a web service and application allow users to point and sync contacts, files, media, etc. by simply locating another endpoint using line of sight. Synchronization can occur through the cloud or directly via WIFI/BlueTooth, etc. The number of scenarios are limitless, so only a few are named here, and for the same reason, a great variety of user interfaces can be provided to correspond to such scenarios as well.

While each of the various embodiments below are presented independently, e.g., as part of the sequence of respective Figures, one can appreciate that an integrated handset, as described, can incorporate or combine two or more of any of the embodiments. Given that each of the various embodiments improve the overall services ecosystem in which users wish to operate, together a synergy results from combining different benefits when a critical user adoption mass is reached. Specifically, when a direction based pointing services platform provides the cross benefits of different advantages, features or aspects of the various embodiments described herein, users are more likely to use such a beneficial platform. As a generally recognized relationship, the more likely users will be to use, the more the platform gains critical mass according to the so-called network effect of adoption. Any one feature standing alone may or may not gain such critical mass, and accordingly, the combination of different embodiments described below shall be considered herein to represent a host of further alternate embodiments.

In various embodiments, a portable electronic device includes a positional component for receiving positional information as a function of a location of the portable electronic device, a directional component that outputs direction information as a function of an orientation of the portable electronic device and a location based engine that processes the positional information and the direction information to determine a subset of points of interest relative to the portable electronic device as a function of at least the positional information and the direction information.

The positional component can be a positional GPS component for receiving GPS data as the positional information. The directional component can be a magnetic compass and/or a gyroscopic compass that outputs the direction information. The device can include acceleration component(s), such as accelerometer(s), that outputs acceleration information associated with movement of the portable electronic device. The use of a separate sensor can also be used to further compensate for tilt and altitude adjustment calculations.

In one embodiment, the device includes a cache memory for dynamically storing a subset of endpoints of interest that are relevant to the portable electronic device and at least one interface to a network service for transmitting the positional information and the direction information to the network service. In return, based on real-time changes to the positional information and direction/pointing information, the device dynamically receives in the cache memory an updated subset of endpoints that are potentially relevant to the portable electronic device.

For instance, the subset of endpoints can be updated as a function of endpoints of interest within a pre-defined distance substantially along a vector defined by the orientation of the portable electronic device. Alternatively or in addition, the subset of endpoints can be updated as a function of endpoints of interest relevant to a current context of the portable electronic device. In this regard, the device can include a set of Representational State Transfer (REST)-based application programming interfaces (APIs), or other stateless set of APIs, so that the device can communicate with the service over different networks, e.g., Wi-Fi, a GPRS network, etc. or communicate with other users of the service, e.g., Bluetooth. For the avoidance of doubt, the embodiments are in no way limited to a REST based implementation, but rather any other state or stateful protocol could be used to obtain information from the service to the devices.

The directional component outputs direction information including compass information based on calibrated+ compensated heading/directionality information. The directional component can also include direction information indicating upward or downward tilt information associated with a current upward or downward tilt of the portable electronic device, so that the services can detect when a user is pointing upwards or downwards with the device in addition to a certain direction. The height of the device itself can also be taken into account to distinguish between an event of pointing with a device from the top of a building (likely pointing to other buildings, bridges, landmarks, etc.) and the same event from the bottom of the building (likely pointing to a shop at ground level). One can also use a 3-axis magnetic field sensor to implement a compass to obtain tilt readings.

In this respect, a gesturing component can also be included in the device to determine a current gesture of a user of the portable electronic device from a set of pre-defined gestures. For instance, gestures can include zoom in, zoom out, panning to define an arc, all to help filter over potential subsets of points of interest for the user.

For instance, FIG. 1 illustrates a mobile computing device 100 according to an embodiment. In this regard, a set of services 160 can be built based on location information 122 and direction information 132 collected by the phone. For instance, location information 122 can be recorded by a location subsystem 120 such as a GPS subsystem communicating with GPS satellites 140. Direction or pointing information 132 can be collected by a direction subsystem 130, such as a compass, e.g., gyroscopic, magnetic, digital compass, etc. In addition, optionally, movement information 112 can be gathered by the device 100, e.g., via tower triangulation algorithms, and/or acceleration of the device 100 can be measured as well, e.g., with an accelerometer. The collective information 150 can be used to gain a sense of not only where the device 100 is located in relation to other potential points of interest tracked or known by the overall set of services 160, but also what direction the user is pointing the device 100, so that the services 160 can appreciate at whom or what the user is pointing the device 100.

In addition, a gesture subsystem 170 can optionally be included, which can be predicated on any one or more of the motion information 112, location information 122 or direction information 132. In this regard, not only can direction information 132 and location information 122 be used to define a set of unique gestures, but also motion information 112 can be used to define an even more complicated set of gestures.

As mentioned, in another aspect, a device 100 can include a client side cache 180 of potentially relevant points of interest, which, based on the user's movement history can be dynamically updated. The context, such as geography, speed, etc. of the user can be factored in when updating. For instance, if a user's velocity is 2 miles an hour, they may be walking and interested in updates at a city block by city block level, or at a lower level granularity if they are walking in the countryside. Similarly, if a user is moving on a highway at 60 miles per hour, the block-by-block updates of information are no longer desirable, but rather a granularity can be provided and predictively cached on the device 100 that makes sense for the speed of the vehicle.

In various alternative embodiments, gyroscopic or magnetic compasses can provide directional information. A REST based architecture enables data communications to occur over different networks, such as Wi-Fi and GPRS architectures. REST based APIs can be used, though any stateless messaging can be used that does not require a long keep alive for communicated data/messages. This way, since networks can go down with GPRS antennae, seamless switching can occur to Wi-Fi or Bluetooth networks to continue according to the pointing based services enabled by the embodiments described herein. The device includes a file system to interact with a local cache, store updates for synchronization to the service, exchange information by Bluetooth with other users of the service, etc. Accordingly, operating from a local cache, at least the data in the local cache is still relevant at a time of disconnected, the user can still interact with the data, and finally synchronize according to any updates made when re-connected to the network, or to another device that has more up to date GPS data, POI data, etc. In this regard, a switching architecture is adopted for the device to perform a quick transition from connectivity from one networked system (e.g., cell phone towers) to another computer network (e.g., Wi-Fi) to a local network (e.g., mesh network of Bluetooth connected devices).

With respect to user input, a set of soft keys, touch keys, etc. can be provided to facilitate in the directional-based pointing services provided herein. A device can include a windowing stack in order to overlay different windows, or provide different windows of information regarding a point of interest (e.g., hours and phone number window versus interactive customer feedback window). Audio can be rendered or handled as input by the device. For instance, voice input can be handled by the service to explicitly point without the need for a physical movement of the device. For instance, a user could say into a device "what is this building to my right?" and have the device transmit current direction/movement information to a service, which in turn intelligently determines what the building to the right of the user is, and returns a host of relevant information about the building.

In this respect, a device can include a variety of spatial and map components and intelligence to determine intersections for directional arcs. For instance, objects of interest could be represented with exact boundaries, approximated with spheres, subshells (stores in a mall) of a greater shell (mall), hierarchically arranged, etc. Dynamically generated bounding boxes can also be implemented work, i.e., any technique can be used to obtain boundary information for use in an intersection algorithm. Thus, such boundaries can be implicitly or explicitly defined for the POIs.

Thus, the device includes an intersection component that interprets pointing information relative to a set of potential points of interest. The engine can perform such intersections knowing what the resolution of the measuring instruments are on the device, such as the resolution of a GPS system. As described in more detail below, such techniques include taking into account how far a user is from a potential point of interest, the size of the point of interest and how that is defined, as well as the resolution of location instrumentation, such as the GPS system. The device can also optionally include an altimeter, or any other device that gives altitude information. The altitude information can supplement existing location information for certain specialized services where points of interest vary significantly at different altitudes. It is noted that GPS itself has some information about altitude in its encoding.

Figure 2:
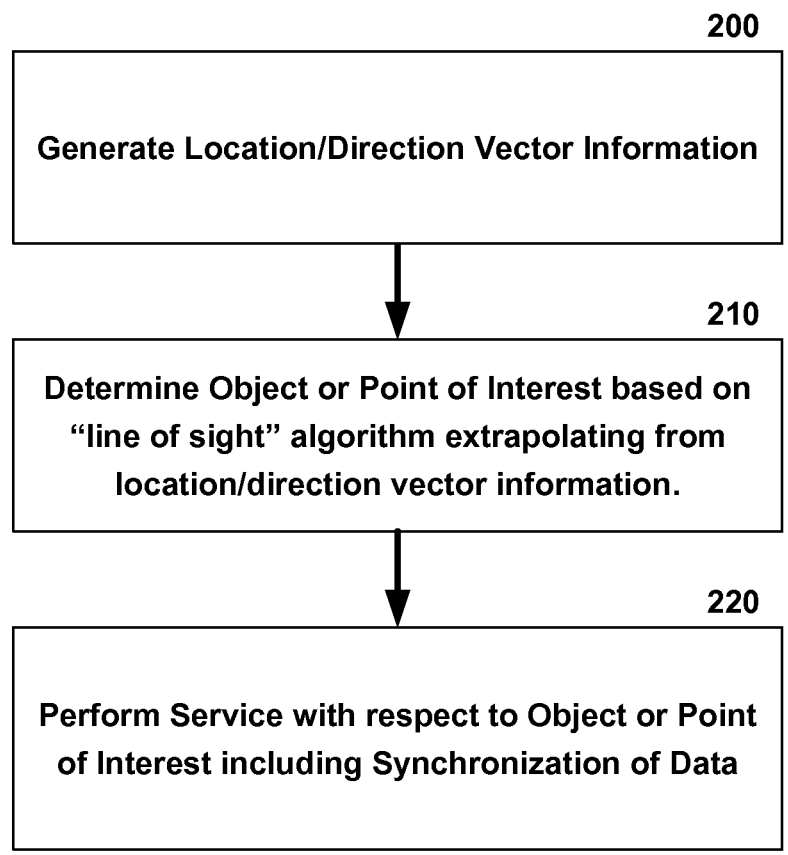
FIG. 2 is an exemplary non-limiting flow diagram of a line of sight process for performing direction based services with respect to points of interest.

A representative interaction with a pointing device as provided in one or more embodiments herein is illustrated in FIG. 2. At 200, location/direction vector information is determined based on the device measurements. This information can be recorded so that a user's path or past can be used when predictively factoring what the user will be interested in next. Based on the vector information, or more informally, the act of pointing by the user, at 210, an object or point of interest is selected based on any of a variety of "line of sight" algorithms that fall within or outside of the vector path. It is noted that occlusion culling techniques can optionally be used to facilitate overlay techniques. Whether the point of interest at issue falls within the vector can factor in the error in precision of any of the measurements, e.g., different GPS subsystems have different error in precision. In this regard, one or more items or points of interest may be found along the vector path or arc, within a certain distance depending on context. At 220, any of a great variety of services can be performed with respect to any point of interest selected by the user via a user interface. Where only one point of interest is concerned, the service can be automatically performed with respect to the point of interest.

Details of various other exemplary, non-limiting embodiments are provided below

Pointing Device, Architecture and User Interfaces

A broad range of scenarios can be enabled by a device where web services effectively resolve vector coordinates sent from mobile endpoints into <x,y,z> or other coordinates using location data, such as GPS data, as well as configurable, synchronized POV information similar to that found in a GPS system in an automobile. In this regard, any of the embodiments can be applied similarly in any motor vehicle device. One non-limiting use is also facilitation of endpoint discovery for synchronization of data of interest to or from the user from or to the endpoint.

For greater understanding, in one non-limiting implementation, by effectively using an accelerometer in coordination with an on board digital compass, an application running on a mobile device updates what each endpoint is "looking at" or pointed towards, attempting hit detection on potential points of interest to either produce real-time information for the device or to allow the user to select a range, or using the GPS, a location on a map, and set information such as "Starbucks—10% off cappuccinos today" or "The Alamo—site of . . . " for others to discover. One or more accelerometers can also be used to perform the function of determining direction information for each endpoint as well.

Accordingly, a general device for accomplishing this includes assets to resolve a line of sight vector sent from a mobile endpoint and a system to aggregate that data as a platform, enabling a host of new scenarios predicated on the pointing information known for the device. The act of pointing with a device, such as the user's mobile phone, thus becomes a powerful vehicle for users to discover and interact with points of interest around the individual in a way that is tailored for the individual. Synchronization of data can also be performed to facilitate roaming and sharing of POV data and contacts among different users of the same service.

In a variety of embodiments described herein, 2-dimensional (2D), 3-dimensional (3D) or N-dimensional directional-based search, discovery, and interactivity services are enabled for endpoints in the system of potential interest to the user.

In this regard, the pointing information and corresponding algorithms ultimately depend upon the assets available in a device for producing the pointing information. The pointing information, however produced according to an underlying set of measurement components, and interpreted by an engine, can be one or more vectors. A vector or set of vectors can have a "width" or "arc" associated with the vector for any margin of error associated with the pointing of the device. A panning angle can be defined by a user with at least two pointing actions to encompass a set of points of interest, e.g., those that span a certain angle defined by a panning gesture by the user.

Figure 3:
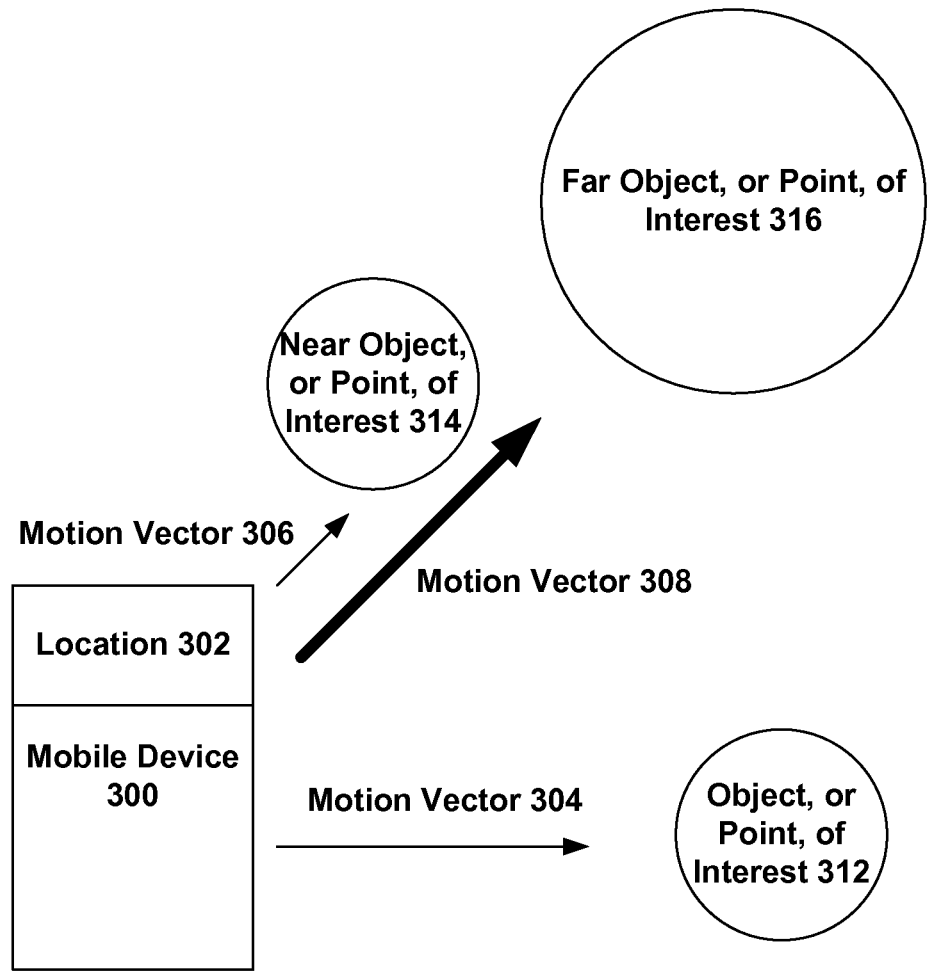
FIG. 3 is a block diagram illustrating the formation of motion vectors for use in connection with location based services.

Among other algorithms for interpreting position/motion/direction information, as shown in FIG. 3, a device 300 employing the direction based location based services 302 as described herein in a variety of embodiments herein include a way to discern between near objects, such as POI 314 and far objects, such as POI 316. Depending on the context of usage, the time, the user's past, the device state, the speed of the device, the nature of the POIs, etc., the service can determine a general distance associated with a motion vector. Thus, a motion vector 306 will implicate POI 314, but not POI 316, and the opposite would be true for motion vector 308.

In addition, a device 300 includes an algorithm for discerning items substantially along a direction at which the device is pointing, and those not substantially along a direction at which the device is pointing. In this respect, while motion vector 304 might implicate POI 312, without a specific panning gesture that encompassed more directions/vectors, POIs 314 and 316 would likely not be within the scope of points of interest defined by motion vector 304. The distance or reach of a vector can also be tuned by a user, e.g., via a slider control or other control, to quickly expand or contract the scope of endpoints encompassed by a given "pointing" interaction with the device.

In one non-limiting embodiment, the determination of at what or whom the user is pointing is performed by calculating an absolute "Look" vector, within a suitable margin of error, by a reading from an accelerometer's tilt and a reading from the magnetic compass. Then, an intersection of endpoints determines an initial scope, which can be further refined depending on the particular service employed, i.e., any additional filter. For instance, for an apartment search service, endpoints falling within the look vector that are not apartments ready for lease, can be pre-filtered.

In addition to the look vector determination, the engine can also compensate for, or begin the look vector, where the user is by establish positioning (~15 feet) through an A-GPS stack (or other location based or GPS subsystem including those with assistance strategies) and also compensate for any significant movement/acceleration of the device, where such information is available.

Figure 4:
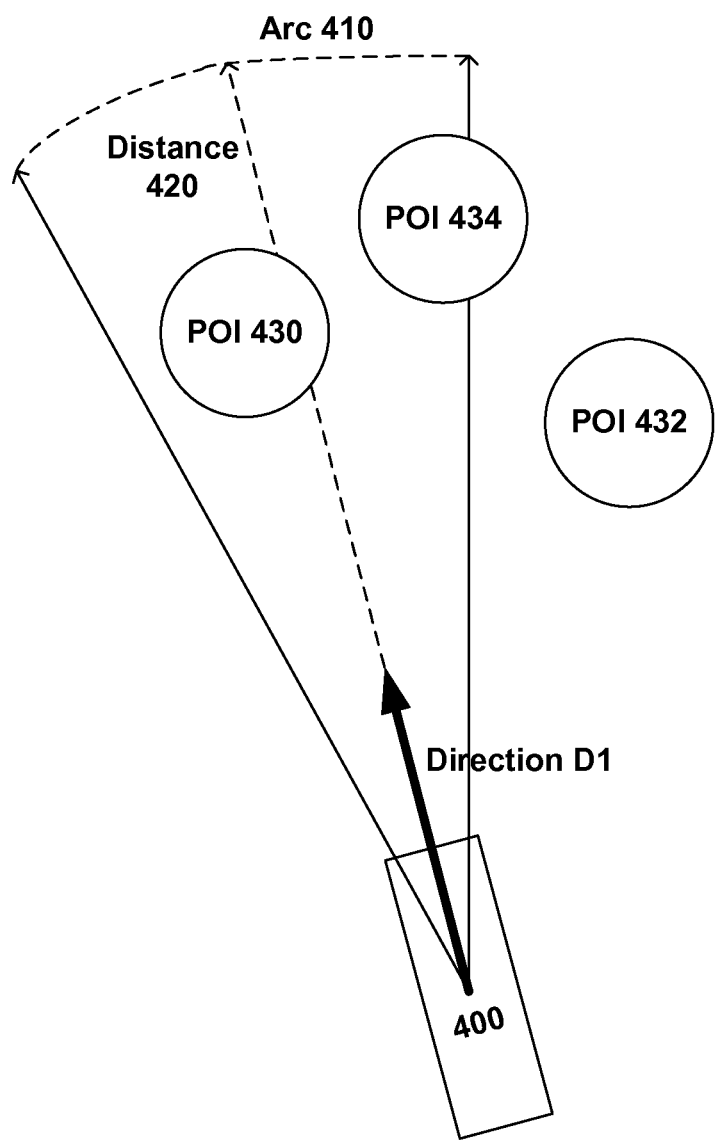
FIG. 4, FIG. 5 and FIG. 6 illustrate aspects of algorithms for determining intersection endpoints with a pointing direction of a device.

As mentioned in connection with FIG. 1, a gesture subsystem 170 can be included in a device 100. In this regard, one can appreciate that a variety of algorithms could be adopted for a gesture subsystem 170. For instance, a simple click-event when in the "pointing mode" for the device 100 can result in determining a set of points of interest for the user. One non-limiting way for achieving this is illustrated in FIG. 4. In FIG. 4, a device 400 is pointed (e.g., point and click) in a direction D1, which according to the device or service parameters, implicitly defines an area within arc 410 and distance 420 that encompasses POI, but does not encompass POI 432. Such an algorithm will also need to determine edge case POI 434, i.e., whether POI 434 is within the scope of pointing in direction D1, since it only partially falls within the area defined by arc 410 and distance 420.

Figure 5:
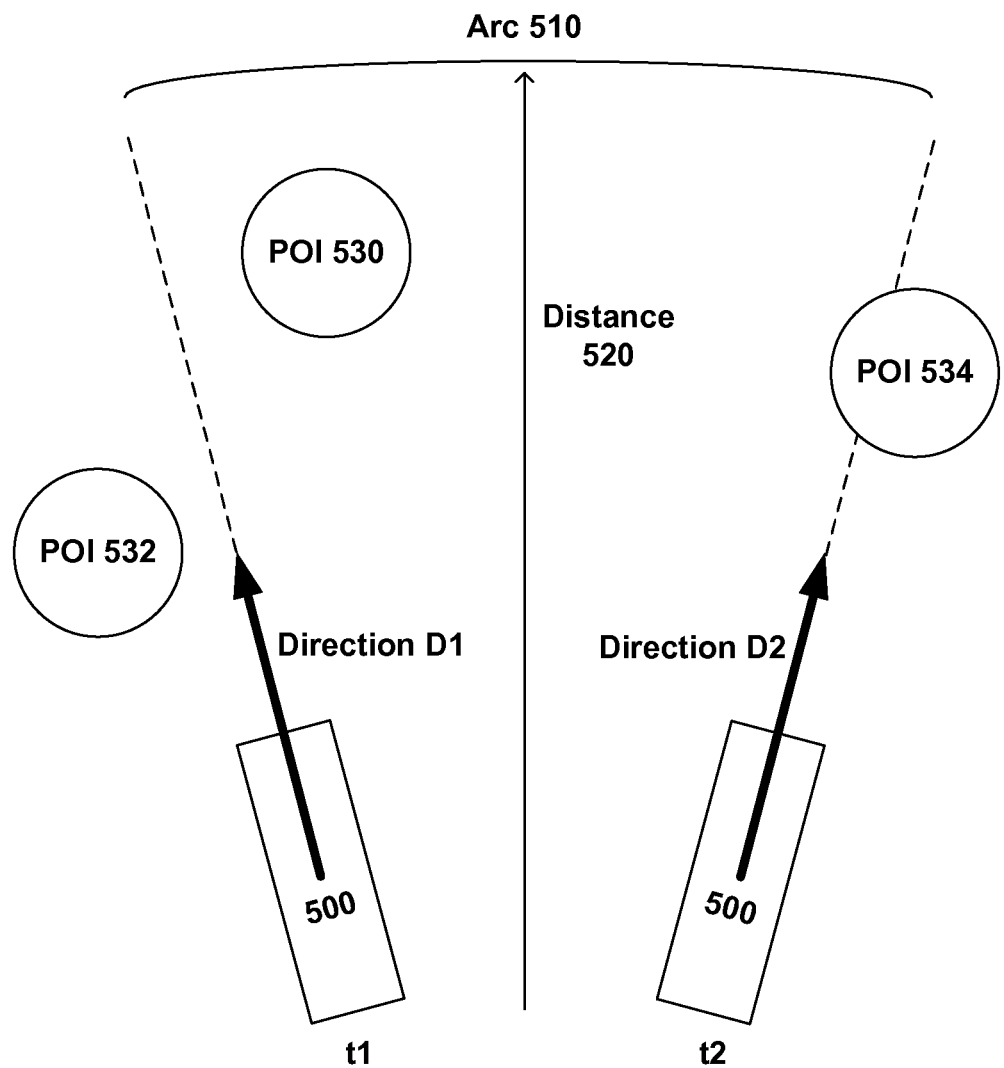

For another non-limiting example, with location information 122 and direction information 132, a user can input a first direction via a click, and then a second direction after moving the device via a second click, which in effect defines an arc 510 for objects of interest in the system as illustrated in FIG. 5. For instance, via first pointing act by the user at time t1 in direction D1 and a second pointing act at time t2 by the user in direction D2, an arc 510 is implicitly defined. The area of interest implicitly includes a search of points of object within a distance 520, which can be zoomed in and out, or selected by the service based on a known granularity of interest, selected by the user, etc. This can be accomplished with a variety of forms of input to define the two directions. For instance, the first direction can be defined upon a click-and-hold button event, or other engage-and-hold user interface element, and the second direction can be defined upon release of the button. Similarly, two consecutive clicks corresponding to the two different directions D1 and D2 can also be implemented.

Figure 6:
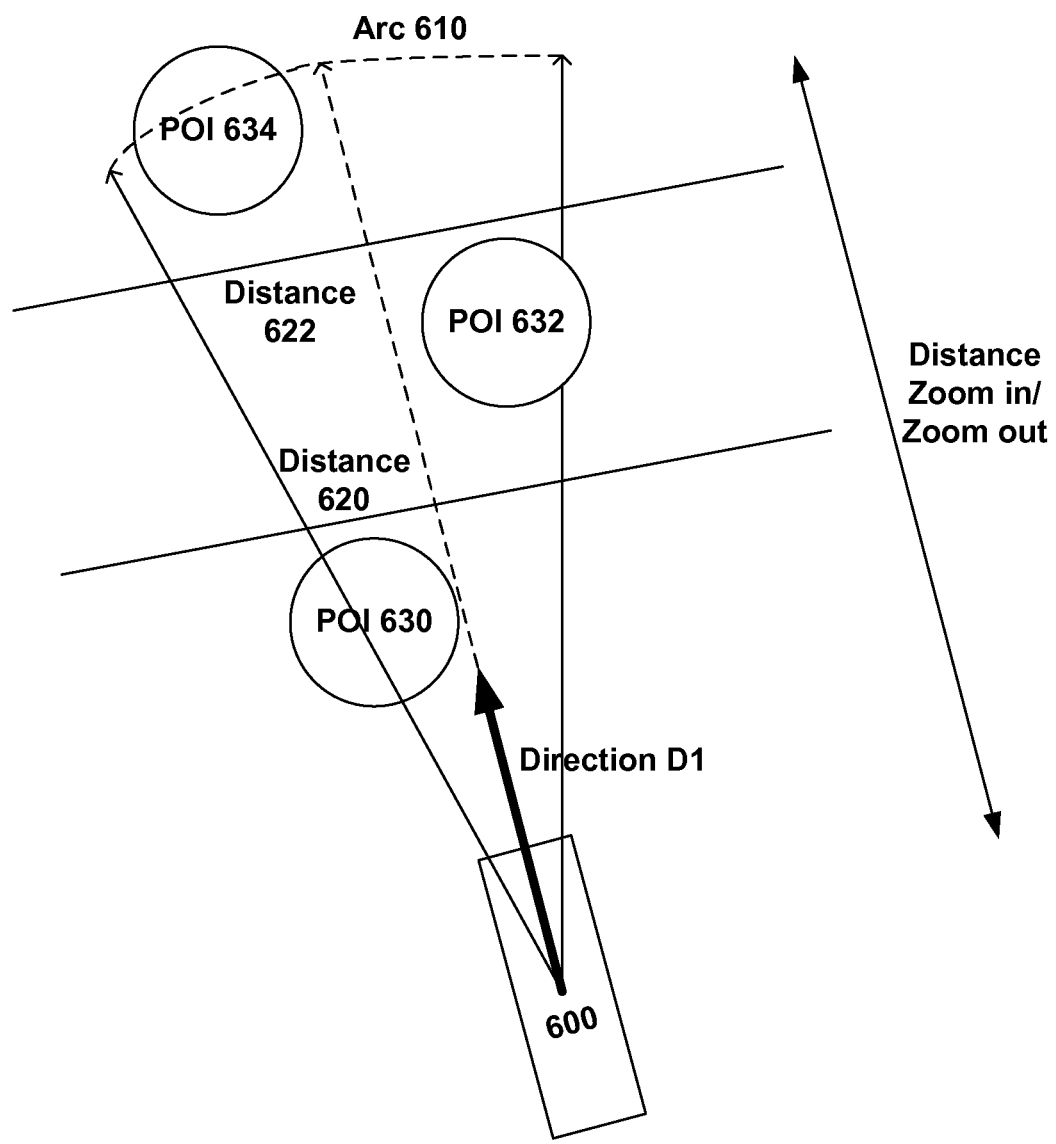

Other gestures that can be of interest in for a gesturing subsystem include recognizing a user's gesture for zoom in or zoom out. Zoom in/zoom out can be done in terms of distance like FIG. 6. In FIG. 6, a device 600 pointed in direction D1 may include zoomed in view which includes points of interest within distance 620 and arc 610, or a medium zoomed view representing points of interest between distance 620 and 622, or a zoomed out view representing points of interest beyond distance 622. These zoom zones correspond to POIs 630, 632 and 634, respectively. More or less zones can be considered depending upon a variety of factors, the service, user preference, etc.

Also, instead of focusing on real distance, zooming in or out could also represent a change in terms of granularity, or size, or hierarchy of objects. For example, a first pointing gesture with the device may result in a shopping mall appearing, but with another gesture, a user could carry out a recognizable gesture to gain or lose a level of hierarchical granularity with the points of interest on display. For instance, after such gesture, the points of interest could be zoomed in to the level of the stores at the shopping mall and what they are currently offering.

In addition, a variety of even richer behaviors and gestures can be recognized when acceleration of the device in various axes can be discerned. Panning, arm extension/retraction, swirling of the device, backhand tennis swings, breaststroke arm action, golf swing motions could all signify something unique in terms of the behavior of the pointing device, and this is to just name a few motions that could be implemented in practice. Thus, any of the embodiments herein can define a set of gestures that serve to help the user interact with a set of services built on the pointing platform, to help users easily gain information about points of information in their environment.

Furthermore, with relatively accurate upward and downward tilt of the device, in addition to directional information such as calibrated and compensated heading/directional information, other services can be enabled. Typically, if a device is ground level, the user is outside, and the device is "pointed" up towards the top of buildings, the granularity of information about points of interest sought by the user (building level) is different than if the user was pointing at the first floor shops of the building (shops level), even where the same compass direction is implicated. Similarly, where a user is at the top of a landmark such as the Empire State building, a downward tilt at the street level (street level granularity) would implicate information about different points of interest that if the user of the device pointed with relatively no tilt at the Statue of Liberty (landmark/building level of granularity).

Also, when a device is moving in a car, it may appear that direction is changing as the user maintains a pointing action on a single location, but the user is still pointing at the same thing due to displacement. Thus, thus time varying location can be factored into the mathematics and engine of resolving at what the user is pointing with the device to compensate for the user experience based upon which all items are relative.

Accordingly, armed with the device's position, one or more web or cloud services can analyze the vector information to determine at what or whom the user is looking/pointing. The service can then provide additional information such as ads, specials, updates, menus, happy hour choices, etc., depending on the endpoint selected, the context of the service, the location (urban or rural), the time (night or day), etc. As a result, instead of a blank contextless Internet search, a form of real-time visual search for users in real 3-D environments is provided.

In one non-limiting embodiment, the direction based pointing services are implemented in connection with a pair of glasses, headband, etc. having a corresponding display means that acts in concert with the user's looking to highlight or overlay features of interest around the user.

Figure 7:
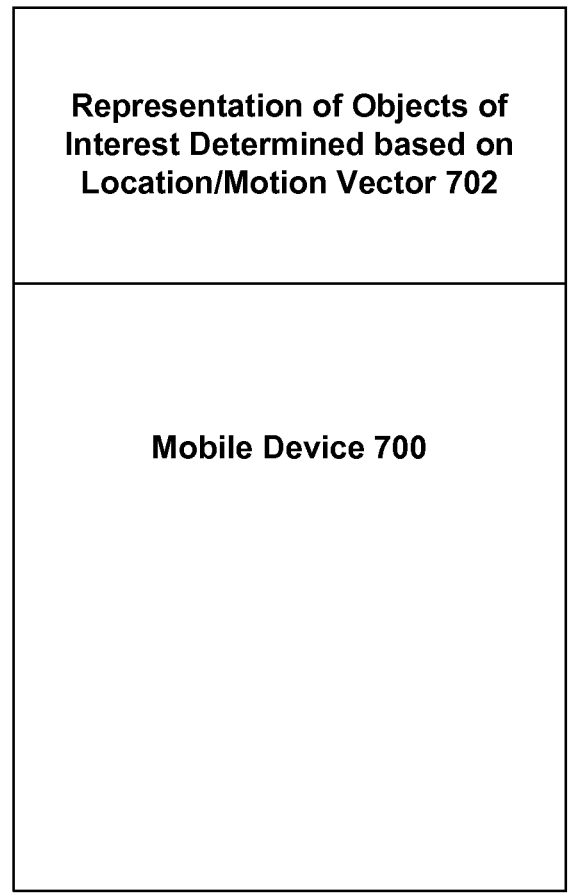
FIG. 7 represents a generic user interface for a mobile device for representing points of interest based on pointing information.

As shown in FIG. 7, once a set of objects is determined from the pointing information according to a variety of contexts of a variety of services, a mobile device 700 can display the objects via representation 702 according to a variety of user experiences tailored to the service at issue. For instance, a virtual camera experience can be provided, where POI graphics or information can be positioned relative to one another to simulate an imaging experience. A variety of other user interface experiences can be provided based on the pointing direction as well.

Figure 8:
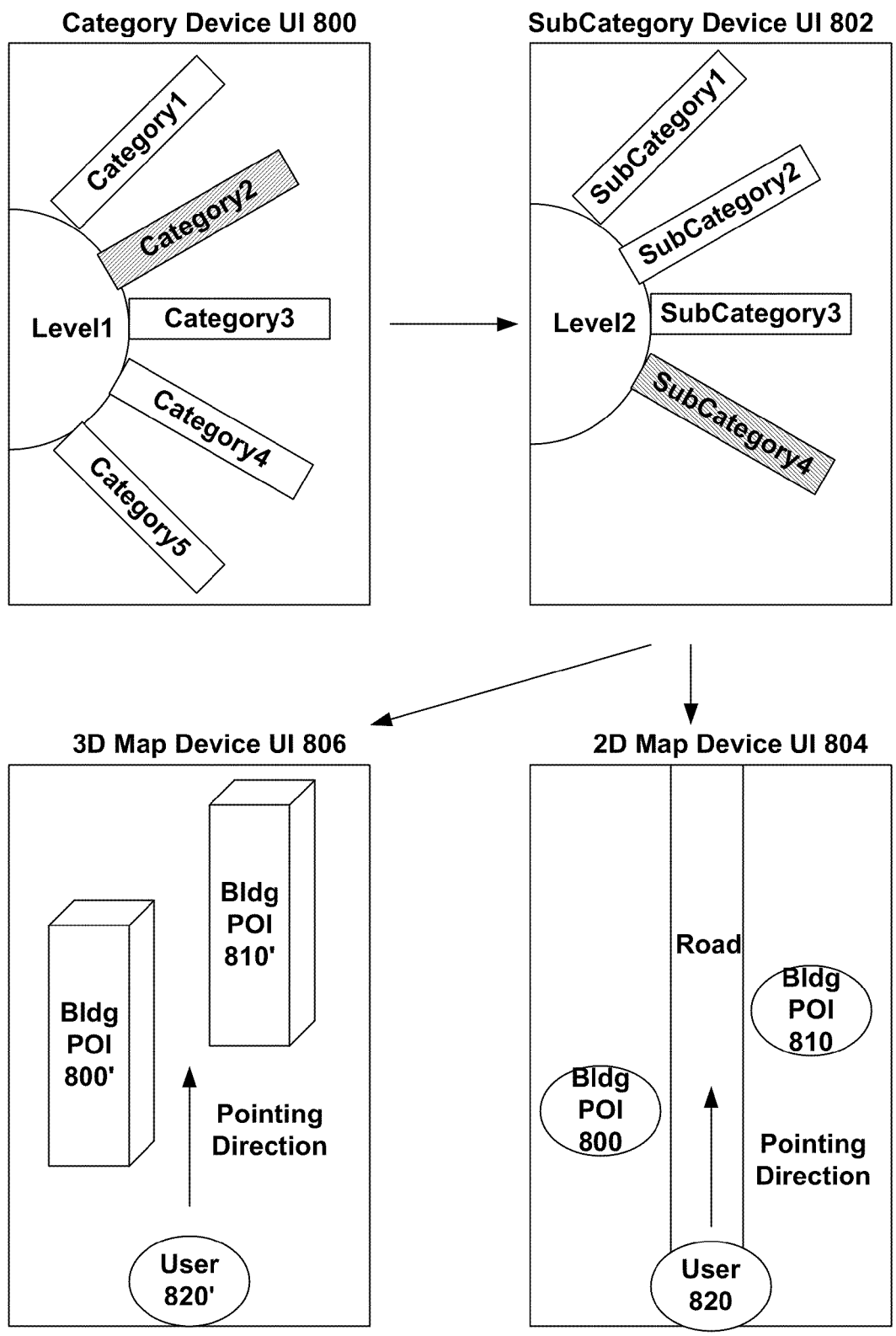
FIG. 8 represents some exemplary, non-limiting alternatives for user interfaces for representing point of interest information.
Figure 9:
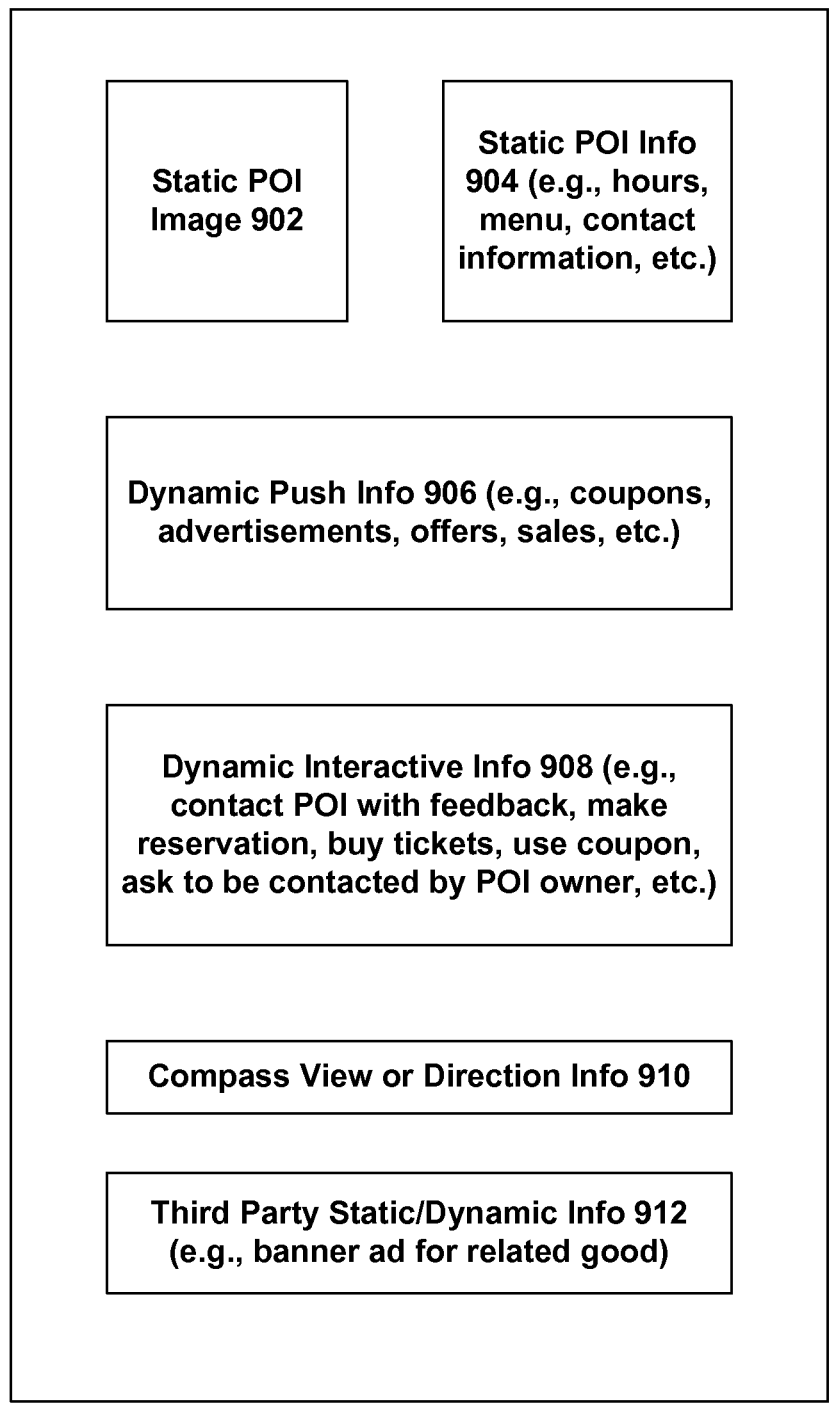
FIG. 9 represents some exemplary, non-limiting fields or user interface windows for displaying static and dynamic information about a given point of interest.

For instance, a set of different choices are shown in FIG. 8. UI 800 and 802 illustrate navigation of hierarchical POI information. For instance, level1 categories may include category1, category2, category3, category4 and category5, but if a user selects around the categories with a thumb-wheel, up-down control, or the like, and chooses one such as category2. Then, subcategory1, subcategory2, subcategory3 and subcategory4 are displayed as subcategories of category2. Then, if the user selects, for instance, subcategory4, perhaps few enough POIs, such as buildings 800 and 810 are found in the subcategory in order to display on a 2D map UI 804 along the pointing direction, or alternatively as a 3D virtual map view 806 along the pointing direction.

Once a single POI is implicated or selected, then a full screen view for the single POI can be displayed, such as the exemplary UI 900. UI 900 can have one or more of any of the following representative areas. UI 900 can include a static POI image 902 such as a trademark of a store, or a picture of a person. UI 900 can also include other media, and a static POI information portion 904 for information that tends not to change such as restaurant hours, menu, contact information, etc. In addition, UI 900 can include an information section for dynamic information to be pushed to the user for the POI, e.g., coupons, advertisements, offers, sales, etc. In addition, a dynamic interactive information are 908 can be included where the user can fill out a survey, provide feedback to the POI owner, request the POI to contact the user, make a reservation, buy tickets, etc. UI 900 also can include a representation of the direction information output by the compass for reference purposes. Further, UI 900 can include other third party static or dynamic content in area 912.

When things change from the perspective of either the service or the client, a synchronization process can bring either the client or service, respectively, up to date. In this way, an ecosystem is enabled where a user can point at an object or point of interest, gain information about it that is likely to be relevant to the user, interact with the information concerning the point of interest, and add value to services ecosystem where the user interacts. The system thus advantageously supports both static and dynamic content.

Figure 10:
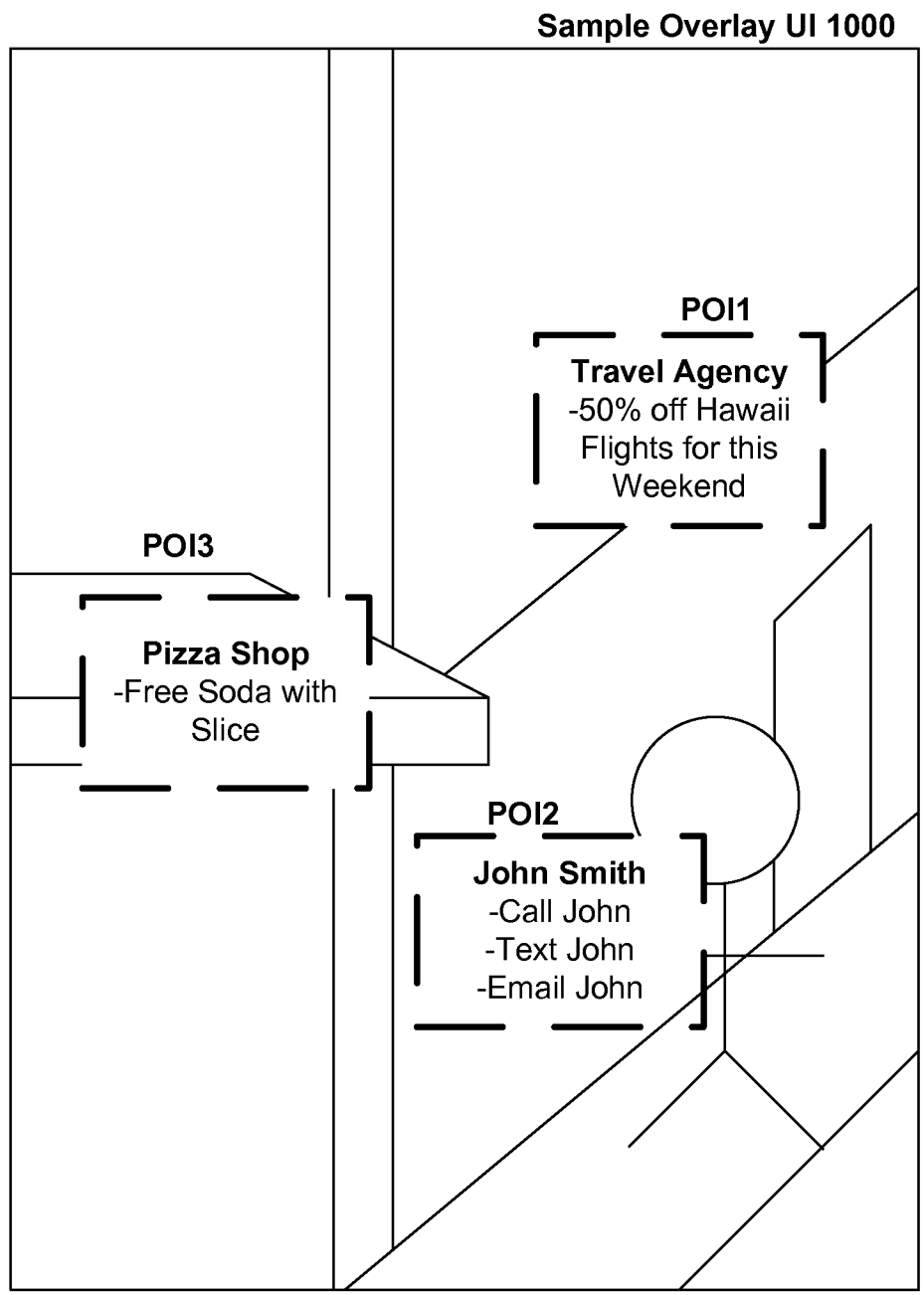
FIG. 10 illustrates a sample overlay user interface for overlaying point of interest information over a camera view of a mobile device.

Other user interfaces can be considered such as left-right, or up-down arrangements for navigating categories, such as in FIG. 8, or a special set of soft-keys can be adaptively provided.

Where a device includes a camera, in one embodiment shown in FIG. 10, a representative non-limiting overlay UI 1000 is shown having 3 POIs POI1, POI2 and POI3. The POIs are overlaid over actual image data being real time viewed on the device via an LCD screen or like display. Thus, as the user aims the camera around his or her environment, the lens becomes the pointer, and the POI information can be overlaid intelligently for discovery of endpoints of interest. Moreover, a similar embodiment can be imagined even without a camera, such as shown in the UI embodiment 806 of FIG. 8 in which 3-D objects are virtually represented based on real geometries known for the objects relative to the user. Thus, the device UI can be implemented consistent with a camera, or a virtual camera, view for intuitive use of such devices. The pointer mechanism of the device could also switch based on whether the user was currently in live view mode for the camera or not. Moreover, assuming sufficient processing power and storage, real time image processing could discern an object of interest and based on image signatures, overlay POI information over such image in a similar manner to the above embodiments. In this regard, with the device provided herein, a variety of gestures can be employed to zoom in zoom out, perform tilt detection for looking down or up, or panning across a field of view to obtain a range of POIs associated with the panning scope.

With respect to a representative set of user settings, a number or maximum number of desired endpoints delivered as results can be configured. How to filter can also be configured, e.g., 5 most likely, 5 closest, 5 closest to 100 feet away, 5 within category or sub-category, alphabetical order, etc. In each case, based on a pointing direction, implicitly a cone or other cross section across physical space is defined as a scope of possible points of interest. In this regard, the width or deepness of this cone or cross section can be configurable by the user to control the accuracy of the pointing, e.g., narrow or wide radius of points and how far out to search.

To support processing of vector information and aggregating POI databases from third parties, a variety of storage techniques, such as relational storage techniques can be used. For instance, Virtual Earth data can be used for mapping and aggregation of POI data can occur from third parties such as Tele Atlas, NavTeq, etc. In this regard, businesses not in the POI database will want to be discovered and thus, the service provides a similar, but far superior from a spatial relevance standpoint, Yellow Pages experiences where businesses will desire to have their additional information, such as menus, price sheets, coupons, pictures, virtual tours, etc. accessible via the system.

In addition, a synchronization platform or framework can keep the roaming caches in sync, thereby capturing what users are looking at and efficiently processing changes. Or, where a user goes offline, local changes can be recorded, and when the user goes back online, such local changes can be synchronized to the network or service store. Also, since the users are in effect pulling information they care about in the here and in the now through the act of pointing with the device, the system generates high cost per thousand impression (CPM) rates as compared to other forms of demographic targeting. Moreover, the system drives impulse buys, since the user may not be physically present in a store, but the user may be near the object, and by being nearby and pointing at the store, information about a sale concerning the object can be sent to the user.

As mentioned, different location subsystems, such as tower triangulation, GPS, A-GPS, E-GPS, etc. have different tolerances. For instance, with GPS, tolerances can be achieved to about 10 meters. With A-GPS, tolerances can be tightened to about 12 feet. In turn, with E-GPS, tolerance may be a different error margin still. Compensating for the different tolerances is part of the interpretation engine for determining intersection of a pointing vector and a set of points of interest. In addition, as shown in FIGS. 4-6, a distance to project out the pointing vector can be explicit, configurable, contextual, etc.

In this regard, the various embodiments described herein can employ any algorithm for distinguishing among boundaries of the endpoints, such as boundary boxes, or rectangles, triangles, circles, etc. As a default radius, e.g., 150 feet could be selected, and such value can be configured or be context sensitive to the service provided. On-line real estate sites can be leveraged for existing POI information. Since different POI databases may track different information at different granularities, a way of normalizing the POI data according to one convention or standard can also be implemented so that the residential real estate location data of Zillow can be integrated with GPS information from Starbucks of all the Starbucks by country.

In addition, similar techniques can be implemented in a moving vehicle client that includes GPS, compass, accelerometer, etc. By filtering based on scenarios (e.g., I need gas), different subsets of points of interest (e.g., gas stations) can be determined for the user based not only on distance, but actual time it may take to get to the point of interest. In this regard, while a gas station may be 100 yards to the right off the highway, the car may have already passed the corresponding exit, and thus more useful information to provide is what gas station will take the least amount of time to drive from a current location based on direction/location so as to provide predictive points of interest that are up ahead on the road, and not already aged points of interest that would require turning around from one's destination in order to get to them.

For existing motor vehicle navigation devices, or other conventional portable GPS navigation devices, where a device does not natively include directional means such as a compass, the device can have an extension slot that accommodates direction information from an external directional device, such as a compass. Similarly, for laptops or other portable electronic devices, such devices can be outfitted with a card or board with a slot for a compass. While any of the services described herein can make web service calls as part of the pointing and retrieval of endpoint process, as mentioned, one advantageous feature of a user's locality in real space is that it is inherently more limited than a general Internet search for information. As a result, a limited amount of data can be predictively maintained on a user's device in cache memory and properly aged out as data becomes stale.

Figure 11:
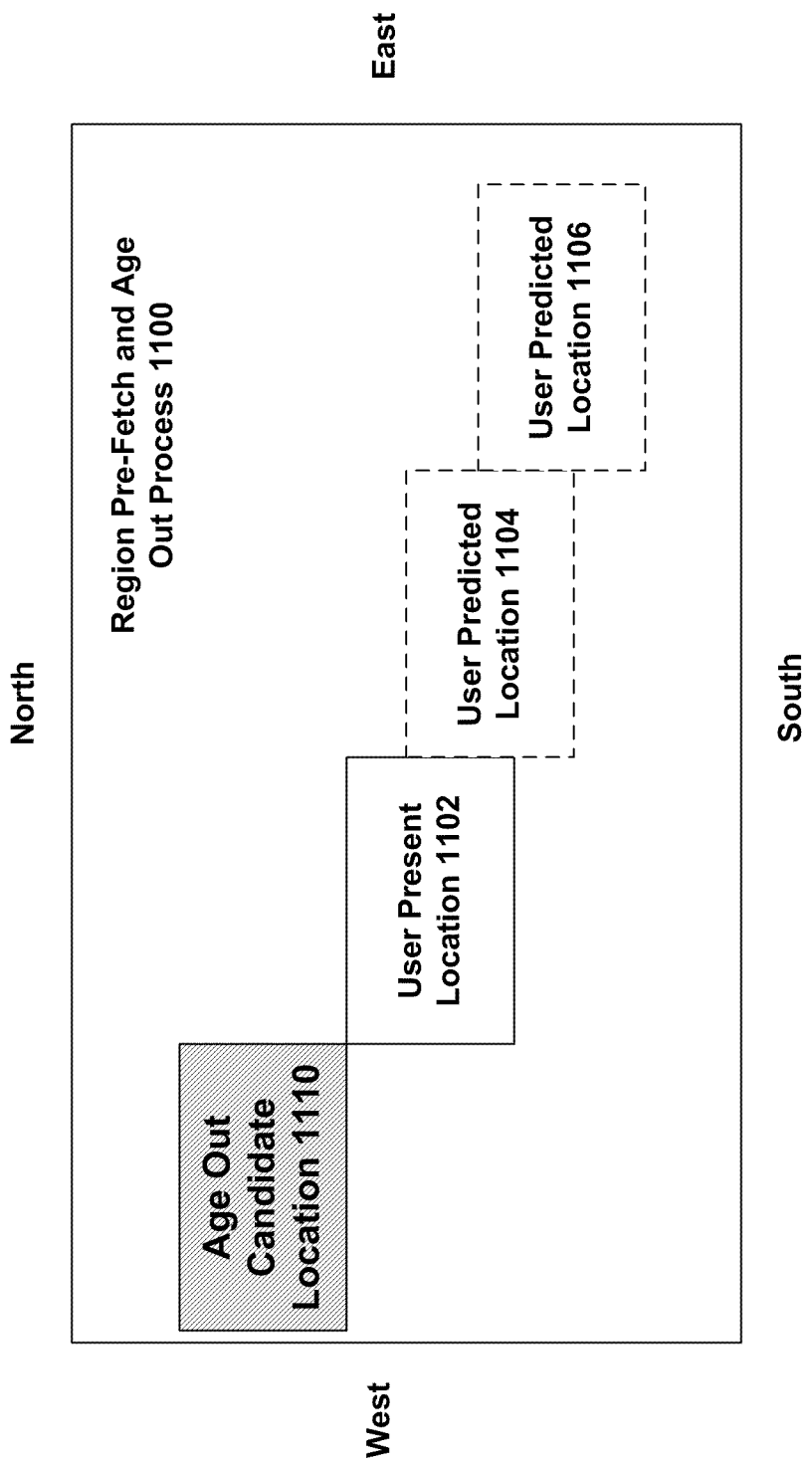
FIG. 11 illustrates a process for predicting points of interest and aging out old points of interest in a region-based algorithm.

While there are a variety of implementations, and ways to sub-divide regions, whether overlapping or not, predictive caching and aging 1100 is conceptually illustrated by FIG. 11 in which a user's present location 1102 is discerned. At this point, the local cache still includes age out candidate location 1110, but as the velocity of the user indicates the user will be at predicted locations 1104 and 1106 in the future, these regions of POIs are downloaded to the mobile device. Accordingly, as the user travels to predicted location 1106, it starts to be clear that the user no longer needs the data from the age out candidate location 1110, which can then be removed, or flagged for removal when storage is challenged.

Accordingly, using the regional data cache, callbacks and an update mechanism that is updated dynamically based on movement, new point of interest can be added by a service or by a user. Update is thus performed continuously or substantially continuously based on updated travel, velocity, speed, etc. In this regard, a user can add a new point of interest in the region, add info to a local cache, and then upload to the zone. To appreciate the problem, the number of worldwide POIs is practically limitless, however only a small number of POIs will be relevant to a user at a given time. Thus, predictively, a cube of data can be taken to the device, the user can go offline such that when the user reconnects, the device is intelligent to figure out what has changed, been weighted, etc., so that the device can synchronize with the network services and expose the user's changes for other people.

The predictive algorithms again depend on what the user is interested in finding, what service the user may be using, the context of the user, etc. They can also be based on velocity, direction, time, etc. For instance, if it is nighttime, assumptions based on demographics or preferences may lead the device to return information about nightclubs or all night diners. Or, instead of giving directions as driving directions that calculate distances as absolute distances, i.e., as the crow flies, a device can take road curves into account since instantaneous pointing information on roads can be collected and handled by a corresponding service when giving driving directions. Or, as another alternative, the direction one is heading on a road, such as a highway with a concrete divider, is relevant to the directions that a navigation system should give. Where a U-turn is unavailable and user passes an exit with a point of interest, for instance, directions should take this into account and consider the heading of the vehicle.

Any device can include the embodiments described herein, including MP3 players, such as a Zune device, GPS navigation devices, bike computers, sunglass/visor systems, motor vehicles, mobile phones, laptops, PDA, etc.

One way to obtain the service applications, assuming the underlying measuring instruments to participate in the real-time gathering of directional information, is to message to a service to obtain the application, e.g., by text messaging to a service, or getting a client download link. Another vehicle for enabling the service is to provide it natively in the operating system or applications of a mobile devices. Since a hardware abstraction layer accommodates different methods for collecting position, direction, acceleration information, the same platform can be used on any device regardless of the precise underlying hardware.

In another aspect of any of the embodiments described herein, because stateless messaging is employed, if communications drop with one network, the device can begin further communicating via another network. For instance, a device has two channels, and a user gets on a bus, but no longer have GPRS or GPS activity. Nonetheless the user is able to get the information the device needs from some other channel. Just because a tower, or satellites are down, does not mean that the device cannot connect through an alternative channel, e.g., the bus's GPS location information via Bluetooth.

With respect to exemplary mobile client architectures, a representative device can include, as described variously herein, client Side Storage for housing and providing fast access to cached POI data in the current region including associated dynamically updated or static information, such as annotations, coupons from businesses, etc. This includes usage data tracking and storage. In addition, regional data can be a cached subset of the larger service data, always updated based on the region in which the client is roaming. For instance, POI data could include as a non-limiting example, the following information:

| | |
|---|---|
| POI coordinates and data | //{-70.26322, 43.65412, "STARBUCK'S"} |
| Localized annotations | //Menu, prices, hours of operation, etc |
| Coupons and ads | //Classes of coupons (new user, returning, etc) |

Support for different kinds of information (e.g., blob v structured information (blob for storage and media; structured for tags, annotations, etc.)

A device can also include usage data and preferences to hold settings as well as usage data such as coupons "activated," waypoints, businesses encountered per day, other users encountered, etc. to be analyzed by the cloud services for business intelligence analysis and reporting.

A device can also include a continuous update mechanism, which is a service that maintains the client's cached copy of a current region updated with the latest. Among other ways, this can be achieved with a ping-to-pull model that pre-fetches and swaps out the client's cached region using travel direction and speed to facilitate roaming among different regions. This is effectively a paging mechanism for upcoming POIs. This also includes sending a new or modified POI for the region (with annotations+coupons), sending a new or modified annotation for the POIs (with coupons), or sending a new or modified coupon for the POI.

A device can also include a Hardware Abstraction Layer (HAL) having components responsible for abstracting the way the client communicates with the measuring instruments, e.g., the GPS driver for positioning and LOS accuracy (e.g., open eGPS), magnetic compass for heading and rotational information (e.g., gyroscopic), one or more accelerometers for gestured input and tilt (achieves 3D positional algorithms, assuming gyroscopic compass).

As described earlier, a device can also include methods/interfaces to make REST calls via GPRS/Wi-Fi and a file system and storage for storing and retrieving the application data and settings.

A device can also include user input and methods to map input to the virtual keys. For instance, one non-limiting way to accomplish user input is to have softkeys as follows, though it is to be understood a great variety of user inputs can be used to achieve interaction with the user interfaces of the pointing based services.

| | |
|---|---|
| SK up/down: | //Up and down on choices |
| SK right, SK ok/confirm: | //Choose an option or drill down/next |
| SK left, SK cancel/back, | //Go back to a previous window, cancel |
| Exit / Incoming Call events | //Exit the app or minimize |

In addition, a representative device can include a graphics and windowing stack to render the client side UI, as well as an audio stack to play sounds/alerts.

As mentioned, such a device may also include spatial and math computational components including a set of APIs to perform 3D collision testing between subdivided surfaces such as spherical shells (e.g., a simple hit testing model to adopt and boundary definitions for POIs), rotate points, and cull as appropriate from conic sections.

Figure 12:
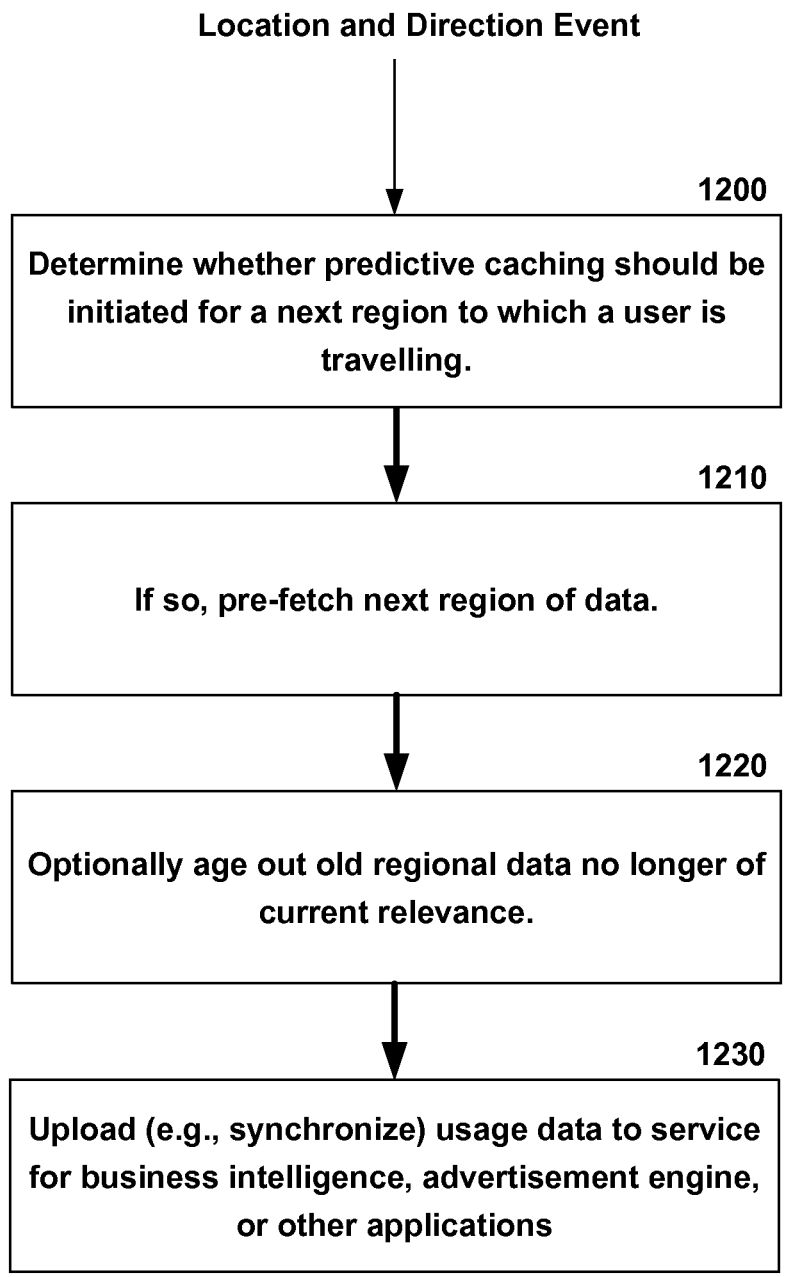
FIG. 12 illustrates a first process for a device upon receiving a location and direction event.
Figure 13:
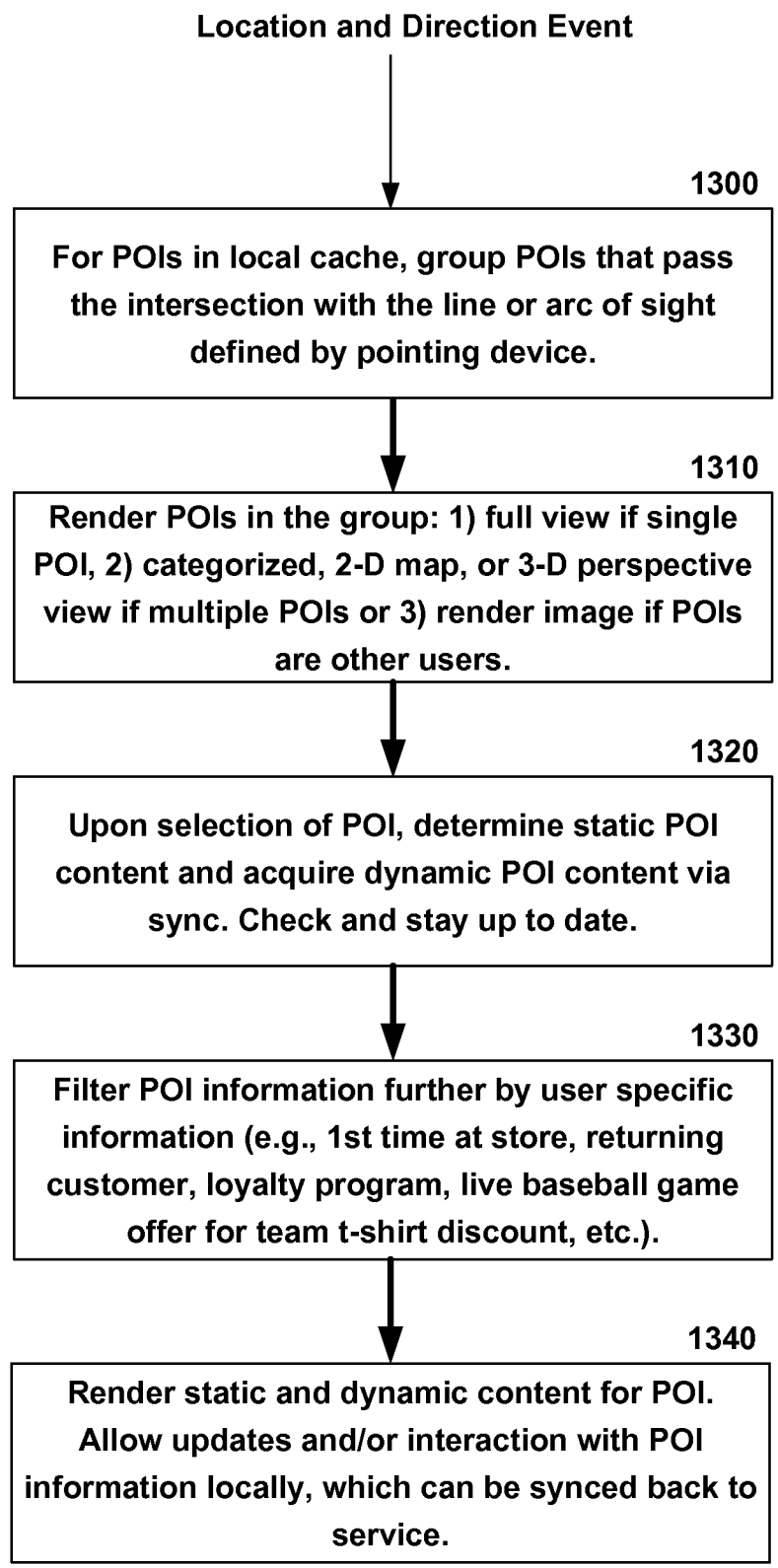
FIG. 13 illustrates a second process for a device upon receiving a location and direction event.

As described in various embodiments herein, FIGS. 12 and 13 illustrate two processes for a device when location (e.g., GPS) and direction (e.g., compass) events occur. In FIG. 12, upon the occurrence of a location or direction event, at 1200, it is determined whether predictive caching should be initiated for a next region to which a user is travelling. At 1210, if so, then the next region of data can be pre-fetched. At 1220, old regional data no longer of relevance can be aged out. At 1230, any usage data can be uploaded to the service framework for business intelligence, input to an advertisement engine, etc.

FIG. 13 represents another process for filtering potential POIs after a pointing event. Upon the detection of a location and direction event, at 1300, for POIs in the device's local cache, a group of POIs are determined that pass an intersection algorithm for the direction of pointing of the device. At 1310, POIs in the group can be represented in some fashion on a UI, e.g., full view if only 1 POI, categorized view, 2-D map view, 3-D perspective view, or user images if other users, etc. The possibilities for representation are limitless; the embodiments described herein are intuitive based on the general notion of pointing based direction services.

At 1320, upon selection of a POI, static content is determined and any dynamic content is acquired via synchronization. When new data becomes available, it is downloaded to stay up to date. At 1330, POI information is filtered further by user specific information (e.g., if it is the user's first time at the store, returning customer, loyalty program member, live baseball game offer for team clothing discounts, etc.). At 1340, static and dynamic content that is up to date is rendered for the POI. In addition, updates and/or interaction with POI information is allowed which can be synced back to the service.

Figure 14:
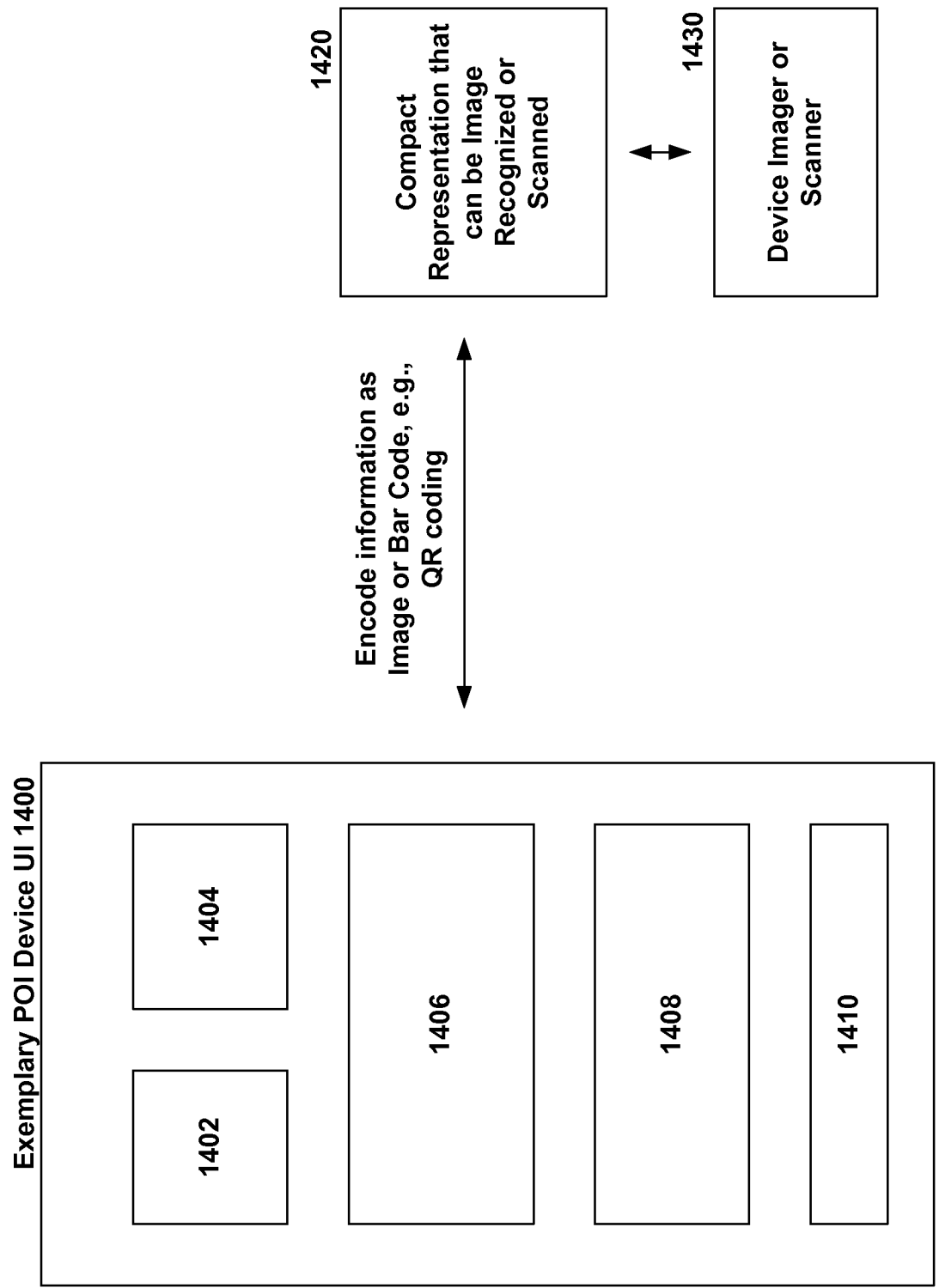
FIG. 14 illustrates a sample block diagram for encoding point of interest information in a compact format that can be scanned or imaged by a device to reveal the information via a networked service.

FIG. 14 illustrates a general block diagram for an optional encoding technique for the POI information of the various embodiments described herein. The idea is that the various pieces of static and dynamic information 1402, 1404, 1406, 1408, 1410, etc. for a POI, which are normally represented as UI 1400 on the device, can also be encoded as an image or a bar code 1420, or some other device readable compact encoding.

For instance, in an optional Quick Response (QR) support embodiment, decompression allows users to take pictures of a QR code and process its contents where information has been encoded into a sticker/printout for display outside of a business (e.g., in the form of a copyrighted URL). The code need not be a QR code, but could be any code that can be read or scanned or processed to determine its underlying content. For instance, with a visual representation, a picture can be taken and processed, or with the bar code, the device can scan it. RF identification technology could also be used. For the avoidance of doubt, any encoded image format can be used, like a bar code, only one example of which is a QR code.

In effect, this enables a query for POI information via a QR code or other encoding. The user scans or images the code with a device 1430, and then transmits the code to the service, which translates the code into static and dynamically updated user information for display as a UI 1400 (or other user interface representation) so that the user can query about a POI merely by pointing at it. A URL for the POI can also be encoded in a format such as a QR code. In one non-limiting embodiment, the user can point the device at a QR code, and decode a given image with the QR code.

Exemplary Networked and Distributed Environments

One of ordinary skill in the art can appreciate that the various embodiments of methods and devices for pointing based services and related embodiments described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Figure 15:
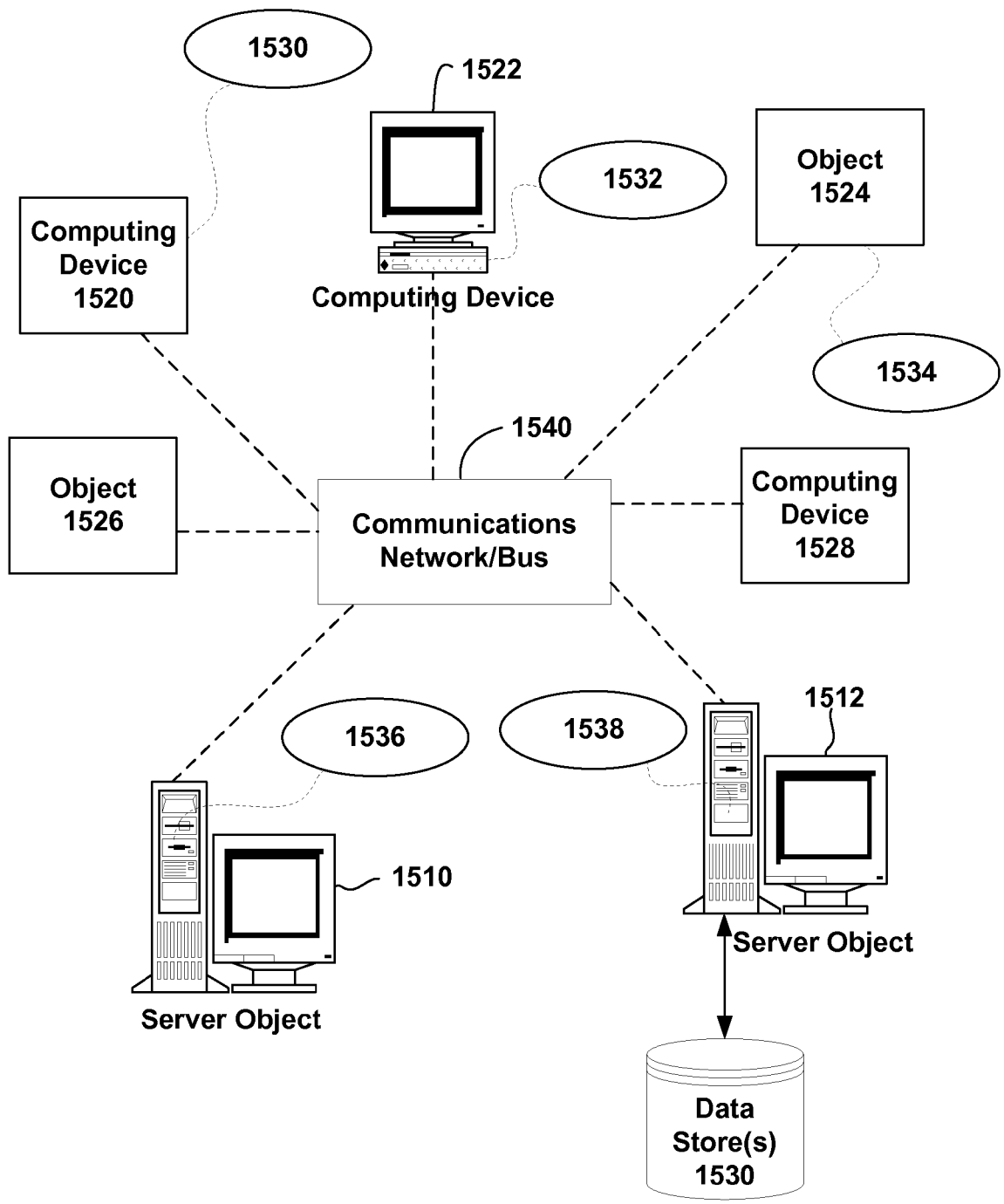
FIG. 15 is a block diagram representing an exemplary non-limiting networked environment in which embodiment(s) may be implemented.

FIG. 15 provides a non-limiting schematic diagram of an exemplary networked or distributed computing environment. The distributed computing environment comprises computing objects 1510, 1512, etc. and computing objects or devices 1520, 1522, 1524, 1526, 1528, etc., which may include programs, methods, data stores, programmable logic, etc., as represented by applications 1530, 1532, 1534, 1536, 1538. It can be appreciated that objects 1510, 1512, etc. and computing objects or devices 1520, 1522, 1524, 1526, 1528, etc. may comprise different devices, such as PDAs, audio/video devices, mobile phones, MP3 players, laptops, etc.

Each object 1510, 1512, etc. and computing objects or devices 1520, 1522, 1524, 1526, 1528, etc. can communicate with one or more other objects 1510, 1512, etc. and computing objects or devices 1520, 1522, 1524, 1526, 1528, etc. by way of the communications network 1540, either directly or indirectly. Even though illustrated as a single element in FIG. 15, network 1540 may comprise other computing objects and computing devices that provide services to the system of FIG. 15, and/or may represent multiple interconnected networks, which are not shown. Each object 1510, 1512, etc. or 1520, 1522, 1524, 1526, 1528, etc. can also contain an application, such as applications 1530, 1532, 1534, 1536, 1538, that might make use of an API, or other object, software, firmware and/or hardware, suitable for communication with or implementation of the user profiling in a transaction and advertising platform as provided in accordance with various embodiments.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

Thus, a host of network topologies and network infrastructures, such as client/server, peer-to-peer, or hybrid architectures, can be utilized. In a client/server architecture, particularly a networked system, a client is usually a computer that accesses shared network resources provided by another computer, e.g., a server. In the illustration of FIG. 15, as a non-limiting example, computers 1520, 1522, 1524, 1526, 1528, etc. can be thought of as clients and computers 1510, 1512, etc. can be thought of as servers where servers 1510, 1512, etc. provide data services, such as receiving data from client computers 1520, 1522, 1524, 1526, 1528, etc., storing of data, processing of data, transmitting data to client computers 1520, 1522, 1524, 1526, 1528, etc., although any computer can be considered a client, a server, or both, depending on the circumstances. Any of these computing devices may be processing data, or requesting services or tasks that may implicate the improved user profiling and related techniques as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the user profiling can be provided standalone, or distributed across multiple computing devices or objects.

In a network environment in which the communications network/bus 1540 is the Internet, for example, the servers 1510, 1512, etc. can be Web servers with which the clients 1520, 1522, 1524, 1526, 1528, etc. communicate via any of a number of known protocols, such as the hypertext transfer protocol (HTTP). Servers 1510, 1512, etc. may also serve as clients 1520, 1522, 1524, 1526, 1528, etc., as may be characteristic of a distributed computing environment.

Exemplary Computing Device

As mentioned, various embodiments described herein apply to any device wherein it may be desirable to perform pointing based services. It should be understood, therefore, that handheld, portable and other computing devices and computing objects of all kinds are contemplated for use in connection with the various embodiments described herein, i.e., anywhere that a device may request pointing based services. Accordingly, the below general purpose remote computer described below in FIG. 16 is but one example, and the embodiments of the subject disclosure may be implemented with any client having network/bus interoperability and interaction.

Although not required, any of the embodiments can partly be implemented via an operating system, for use by a developer of services for a device or object, and/or included within application software that operates in connection with the operable component(s). Software may be described in the general context of computer-executable instructions, such as program modules, being executed by one or more computers, such as client workstations, servers or other devices. Those skilled in the art will appreciate that network interactions may be practiced with a variety of computer system configurations and protocols.

Figure 16:
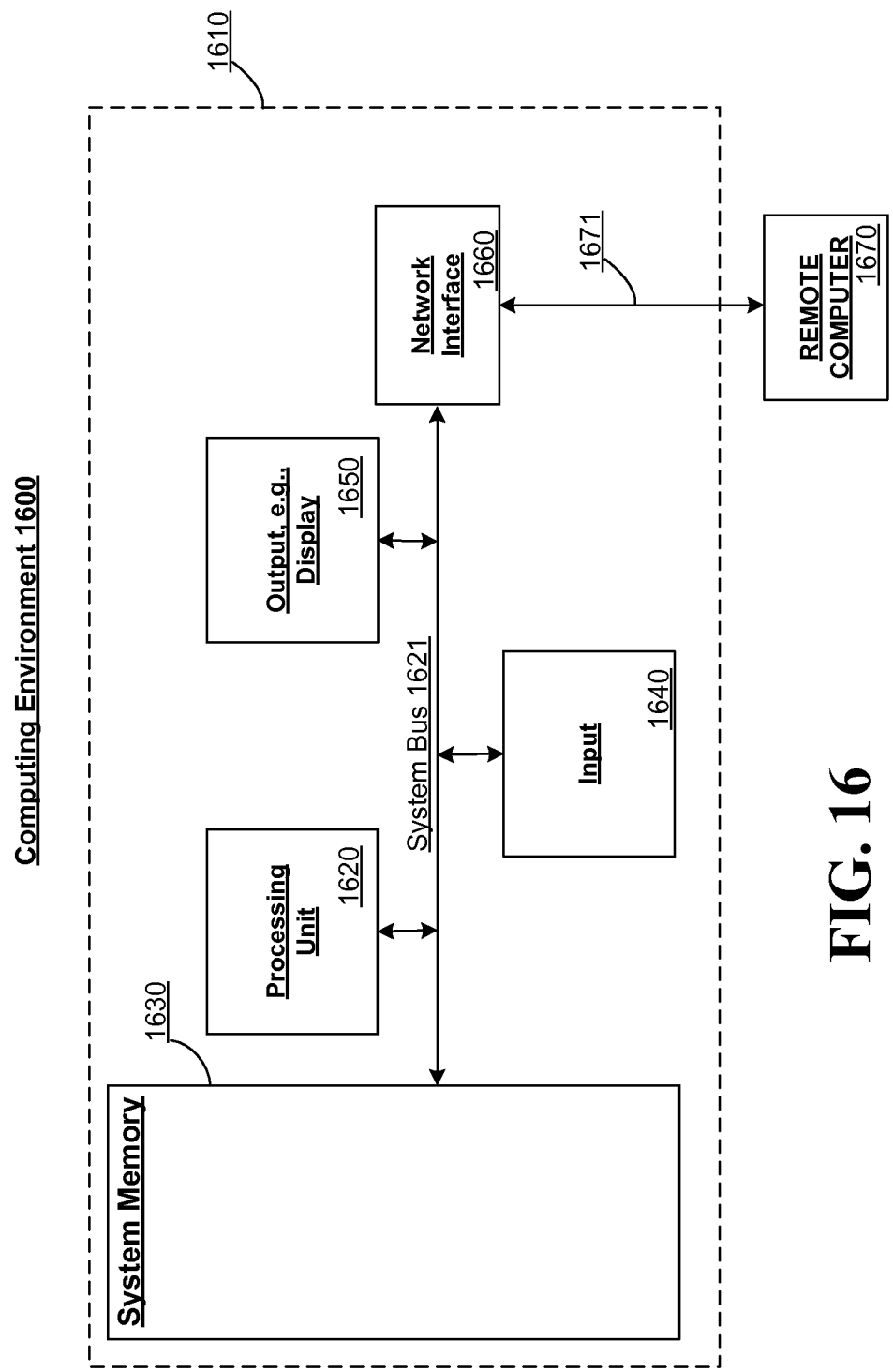
FIG. 16 is a block diagram representing an exemplary non-limiting computing system or operating environment in which aspects of embodiment(s) may be implemented.

FIG. 16 thus illustrates an example of a suitable computing system environment 1600 in which one or more of the embodiments may be implemented, although as made clear above, the computing system environment 1600 is only one example of a suitable computing environment and is not intended to suggest any limitation as to the scope of use or functionality of any of the embodiments. Neither should the computing environment 1600 be interpreted as having any dependency or requirement relating to any one or combination of components illustrated in the exemplary operating environment 1600.

With reference to FIG. 16, an exemplary remote device for implementing one or more embodiments herein can include a general purpose computing device in the form of a handheld computer 1610. Components of handheld computer 1610 may include, but are not limited to, a processing unit 1620, a system memory 1630, and a system bus 1621 that couples various system components including the system memory to the processing unit 1620.

Computer 1610 typically includes a variety of computer readable media and can be any available media that can be accessed by computer 1610. The system memory 1630 may include computer storage media in the form of volatile and/or nonvolatile memory such as read only memory (ROM) and/or random access memory (RAM). By way of example, and not limitation, memory 1630 may also include an operating system, application programs, other program modules, and program data.

A user may enter commands and information into the computer 1610 through input devices 1640 A monitor or other type of display device is also connected to the system bus 1621 via an interface, such as output interface 1650. In addition to a monitor, computers may also include other peripheral output devices such as speakers and a printer, which may be connected through output interface 1650.

The computer 1610 may operate in a networked or distributed environment using logical connections to one or more other remote computers, such as remote computer 1670. The remote computer 1670 may be a personal computer, a server, a router, a network PC, a peer device or other common network node, or any other remote media consumption or transmission device, and may include any or all of the elements described above relative to the computer 1610. The logical connections depicted in FIG. 16 include a network 1671, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices, networks and advertising architectures, the underlying concepts may be applied to any network system and any computing device or system in which it is desirable to derive information about surrounding points of interest.

There are multiple ways of implementing one or more of the embodiments described herein, e.g., an appropriate API, tool kit, driver code, operating system, control, standalone or downloadable software object, etc. which enables applications and services to use the pointing based services. Embodiments may be contemplated from the standpoint of an API (or other software object), as well as from a software or hardware object that provides pointing platform services in accordance with one or more of the described embodiments. Various implementations and embodiments described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

While the various embodiments have been described in connection with the preferred embodiments of the various figures, it is to be understood that other similar embodiments may be used or modifications and additions may be made to the described embodiment for performing the same function without deviating therefrom. Still further, one or more aspects of the above described embodiments may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A portable electronic device, comprising:
   a positional component for receiving positional information as a function of a location of the portable electronic device;
   a directional component that outputs direction information as a function of an orientation of the portable electronic device;
   a location based engine that processes the positional information and the direction information to dynamically determine a subset of points of interest that are within the portable electronic device's line of sight along a vector path determined by at least the positional information and the direction information, the line of sight along the vector path comprising an arc and distance that define a line of sight area, such that points of interest determined to be in the line of sight area are included in the subset of points of interest; and
   an interface configured to display the determined subset of points of interest.

2. The portable electronic device of claim 1, wherein the positional component is a positional global positioning satellite (GPS) component for receiving GPS data as the positional information.

3. The portable electronic device of claim 1, wherein the directional component is a magnetic compass that outputs the direction information.

4. The portable electronic device of claim 1, wherein the directional component is a gyroscopic compass that outputs the direction information.

5. The portable electronic device of claim 1, further comprising:
   an acceleration component that outputs acceleration information associated with movement of the portable electronic device.

6. The portable electronic device of claim 5, wherein the acceleration component comprises at least one accelerometer.

7. The portable electronic device of claim 1, further comprising:
   a cache memory for dynamically storing a subset of endpoints of interest that are relevant to the portable electronic device; and
   at least one interface to a network service for transmitting the positional information and the direction information to the network service and for receiving in return an updated subset of endpoints of relevant to the portable electronic device for storage in the cache memory based on the positional information and direction information.

8. The portable electronic device of claim 7, wherein the updated subset of endpoints is updated as a function of endpoints of interest within a pre-defined distance substantially along a vector defined by the orientation of the portable electronic device.

9. The portable electronic device of claim 7, wherein the updated subset of endpoints is updated as a function of endpoints of interest relevant to a current context of the portable electronic device.

10. The portable electronic device of claim 7, wherein the at least one interface includes Representational State Transfer (REST)-based application programming interfaces (APIs).

11. The portable electronic device of claim 7, wherein the at least one interface includes at least one web services interface.

12. The portable electronic device of claim 1, wherein the directional component outputs direction information including compass information based on North, East, South or West information and direction information including upward or downward tilt information associated with a current upward or downward tilt of the portable electronic device.

13. The portable electronic device of claim 1, wherein the location based engine includes a gesturing component to determine a current gesture of a user of the portable electronic device in connection with a current scope of endpoints of interest for determining the subset of points of interest.

14. A portable electronic device, comprising:
   a processor for processing positional information measured by the device as a function of a location of the portable electronic device and direction information as a function of a direction measured for the portable electronic device to form vector information, wherein the processing dynamically determines a subset of points of interest that are within the portable electronic device's line of sight along a vector path determined by the positional information and the direction information, the line of sight along the vector path comprising an arc and distance that define a line of sight area, such that points of interest determined to be in the line of sight area are included in the subset of points of interest; and an interface for displaying the determined points of interest based on the vector information and determined along the direction from location of the device.

15. The device of claim 14, wherein the set of candidate points of interest are represented hierarchically according to different levels of hierarchy, and the interface enables navigation of the different levels.

16. The device according to claim 14, wherein the set of candidate points of interest are displayed as virtual three dimensional (3-D) objects on a virtual 3-D map from the perspective of the pointing direction defined by the vector information.

17. The device according to claim 14, wherein the set of candidate points of interest are displayed as two dimensional (2-D) objects on a 2-D topographical map rendering perspective based on the pointing direction defined by the vector information.

18. The device according to claim 14, wherein if the set of candidate points of interest is a set of one candidate point of interest, a full screen version of point of interest information is displayed for the candidate point of interest.

19. The device according to claim 14, further comprising:
a transceiver for transmitting the vector information to a network service and receiving the set of candidate points of interest based on an intersection algorithm with respect to the vector information.

20. A method for interacting with a portable electronic device, comprising:
receiving directional inputs at the portable electronic device pointing the device in a direction defining a pointing line generally towards a superset of points of interest;

determining, based on one or more portions of positional and direction information, a set of candidate points of interest that are within the portable electronic device's line of sight along a vector path that substantially intersects with the pointing line, the line of sight along the vector path comprising an arc and distance that define a line of sight area, such that points of interest determined to be in the line of sight area are included in the subset of points of interest;

selecting one of the candidate points of interest; and displaying on the portable electronic device static and dynamically updateable information associated with the selected point of interest.

21. The method of claim 20, further comprising:
transmitting information representing the device location and the pointing line to a network service; and wherein the determining includes receiving the set of candidate points from the network service.

22. The method of claim 21, further comprising:
displaying the direction via an interface portion for representing directional information.

* * * * *